United States Patent
Kawasaki et al.

(10) Patent No.: US 7,857,574 B2
(45) Date of Patent: Dec. 28, 2010

(54) MEDIA PROCESSOR

(75) Inventors: Koji Kawasaki, Shiojiri (JP); Hideki Kawakami, Hata-machi (JP); Koji Yamada, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 443 days.

(21) Appl. No.: 11/877,095

(22) Filed: Oct. 23, 2007

(65) Prior Publication Data

US 2008/0095603 A1    Apr. 24, 2008

(30) Foreign Application Priority Data

Oct. 23, 2006   (JP)   ............................ P2006-288137
Jul. 10, 2007   (JP)   ............................ P2007-180923

(51) Int. Cl.
*B65G 57/02* (2006.01)
*B61L 1/16* (2006.01)

(52) U.S. Cl. .................. 414/792.7; 414/901; 235/98 R; 235/98 B

(58) Field of Classification Search ................. 235/100, 235/98 B, 98 R; 271/262; 369/30.55; 377/15, 377/6–8; 414/901
See application file for complete search history.

(56) References Cited

U.S. PATENT DOCUMENTS

| | | | | |
|---|---|---|---|---|
| 1,767,442 A | * | 6/1930 | Evans et al. | 414/788.9 |
| 4,169,586 A | * | 10/1979 | Tarosky et al. | 271/1 |
| 5,165,340 A | * | 11/1992 | Karlyn et al. | 101/126 |
| 5,518,230 A | * | 5/1996 | Scarlata et al. | 271/186 |
| 5,823,529 A | * | 10/1998 | Mandel et al. | 271/296 |
| 6,146,085 A | * | 11/2000 | Namba et al. | 414/789.9 |
| 6,165,113 A | * | 12/2000 | Reider | 493/25 |
| 6,206,362 B1 | * | 3/2001 | Tan et al. | 271/145 |
| 6,400,659 B1 | | 6/2002 | Kitaoka | |
| 6,490,232 B2 | | 12/2002 | Sato | |
| 6,683,321 B2 | * | 1/2004 | Livingston et al. | 250/559.47 |
| 6,760,052 B2 | | 7/2004 | Cummins et al. | |
| 2004/0187772 A1 | * | 9/2004 | Russ | 118/46 |
| 2006/0044954 A1 | | 3/2006 | Tatekawa | |

FOREIGN PATENT DOCUMENTS

| | | | |
|---|---|---|---|
| JP | 3-84951 | | 8/1991 |
| JP | 2000086055 A | * | 3/2000 |
| JP | 2000-260172 | | 9/2000 |
| JP | 2001-126369 | | 5/2001 |
| JP | 2001-283498 | | 10/2001 |
| JP | 2005-44392 | | 2/2005 |
| JP | 2006-59508 | | 3/2006 |

* cited by examiner

*Primary Examiner*—Gregory W Adams
(74) *Attorney, Agent, or Firm*—Nixon & Vanderhye P.C.

(57) ABSTRACT

A media stacker is adapted to accommodate plate-shaped media in a stacked manner. A sensor with which the media stacker is provided is operable to detect a height of the stacked media accommodated in the media stacker.

7 Claims, 21 Drawing Sheets

MEDIA PROCESSOR

The disclosures of Japanese Patent Application No. 2006-288137 filed on Oct. 23, 2006 and Japanese Patent Application No. 2007-180923 filed on Jul. 10, 2007 including specifications, drawings and claims are incorporated herein by reference in its entireties.

BACKGROUND

The present invention relates to a media processor having a media stacker for accommodating plate-shaped media such as CDs or DVDs.

Media processors such as a disk dubbing device are utilized for writing data on a large number of media such as CDs or DVDs, and CD/DVD publishers are capable of making and publishing media by writing data on the media and conducting label printing on the media. Such a media processor includes: a drive for writing data on the media; a printer for printing on a label face of the media; and a conveyance arm for holding and conveying the media when the media are processed by the drive and the printer (For example, refer to Patent Documents 1 to 3).

Patent Document 1: Japanese Patent Publication No. 2001-126369A

Patent Document 2: Japanese Patent Publication No. 2001-283498A

Patent Document 3: U.S. Pat. No. 6,760,052

The above media processor includes a stacker for accommodating and holding disk-shaped media such as CDs or DVDs in the processor in a stacked manner. However, if a number of media which exceeds maximum capacity of the stacker are conveyed into the stacker by a conveyance arm, the media will spill out of the stacker.

SUMMARY

It is therefore an object of the described embodiments to provide a media processor having a media stacker capable of easily detecting whether a number of the media corresponding to the maximum capacity of the media stacker have already been accommodated in the media stacker.

In order to achieve the above object, according to an aspect of the described embodiments, there is provided a media processor comprising: a media stacker adapted to accommodate plate-shaped media in a stacked manner; and a sensor operable to detect a height of the stacked media accommodated in the media stacker, wherein the media stacker is provided with the sensor. The media stacker may include a bottom face and a side face which define an accommodating space for the media. The sensor may be provided in the side face.

According to the above constitution, according to the result of the detection of the sensor, it is possible to easily detect whether a number of the media accommodated in the stacker has reached the maximum. As a result, it is possible to prevent a number of media which exceeds the maximum capacity of the stacker from being conveyed into the stacker, and to prevent the media from spilling out of the stacker.

The side face may be formed with an opening; and the sensor may include: a lever having a protrusion which is retractably protruded from the opening into the accommodating space; and a sensing element operable to detect a movement of the lever.

According to the above constitution, when the protrusion of the lever is pushed and retracted into the opening by the uppermost medium of the media which are accommodated in the stacker by a predetermined accommodation height, the sensor portion detects the movement of the lever. Therefore, it can be easily and positively detected whether a predetermined number of the media are accommodated in stacker.

An upper part of the protrusion may be formed into an upwardly inclined face toward the side face. A lower face of the protrusion may be formed into a downwardly inclined face toward the side face. An inclined angle of the upwardly inclined face may be larger than that of the downwardly inclined face.

According to the above constitution, since the upper part of the protrusion is formed into a face which is gently inclined with respect to a moving direction of the medium, when a medium enters the accommodating space, the medium smoothly comes into contact with the inclined face. As a result, the protrusion of the lever can be smoothly pushed and retracted into the opening by the weight of the medium. Further, there is no possibility of the occurrence of trouble in which the medium is hooked at the protrusion. Accordingly, the medium can be smoothly sent into the stacker. Here, the "inclined angle" is defined as an angle between a horizontal plane and the inclined face.

A lower part of the protrusion may be formed into a downwardly inclined face toward the side face. A vertical dimension of the downwardly inclined face may be substantially the same as a thickness of a single media.

According to the above constitution, since the uppermost medium of the stacked media, a number of which is the maximum capacity of the stacker, comes into contact with the downwardly inclined face of the protrusion, the vertical dimension of which is substantially the same as the thickness of the single medium, it is possible to detect that the number of the media accommodated in the stacker while the protrusion is positively pushed by the uppermost medium has reached the maximum. Further, since the lower part of the protrusion is formed into a face which is downwardly inclined toward the side face, when the media are taken out from the stacker, it is possible to prevent the media from being hooked at the protrusion. Therefore, the media can be smoothly taken out.

The media processor may further comprise a supporting member pivotably supporting the lever, wherein the supporting member is disposed outside the accommodating space and above the protrusion.

According to the above constitution, the protrusion is subjected to a moment in the withdrawal direction by the moment generated at the time of collision which is not affected by the inclined angle of the inclined face or friction. Therefore, it is possible to obtain a highly reliable detection mechanism.

The media processor may further comprise: a processing unit operable to perform at least one of data writing into the media and label printing on the media; a conveyer operable to convey the media from the processing unit to the media stacker; and a controller operable to control the conveyer, wherein the controller stops the conveyer conveying the media to the media stacker when the sensor detects that the height of the stacked media accommodated in the media stacker becomes a predetermined value.

According to the above-described media processor, an overflow of the media, which is caused when the media are further conveyed into the full stacker, can be positively prevented.

The controller may permit the conveyer to convey the media to the media stacker when the sensor detects that the height of the stacked media accommodated in the media stacker is smaller than the predetermined value.

According to the above constitution, when it is judged that the media accommodated in the stacker portion have been taken out and new media can be accommodated in the stacker, the conveyer restarts conveying the media into the stacker. Accordingly, the process conducted after the stop of conveyance of the media can be smoothly executed.

In another aspect of the described embodiments, a media processor comprises: a media stacker shaped to receive plate-shaped media in a stacked manner, the media stacker including at least one guide face defining an accommodating space for the media; and a sensor operable to detect a height of the stacked media in the accommodating space of the media stacker, the sensor including a deflectable portion protruding into the accommodating space, wherein the media being received in the media stacker keeps the deflectable portion deflected when the stacked media reaches a predetermined height. The deflectable portion is preferably disposed in the guide face.

BRIEF DESCRIPTION OF THE DRAWINGS

The above objects and advantages will become more apparent by describing in detail preferred exemplary embodiments with reference to the accompanying drawings, wherein.

DETAILED DESCRIPTION OF THE EMBODIMENTS

Figure 1:
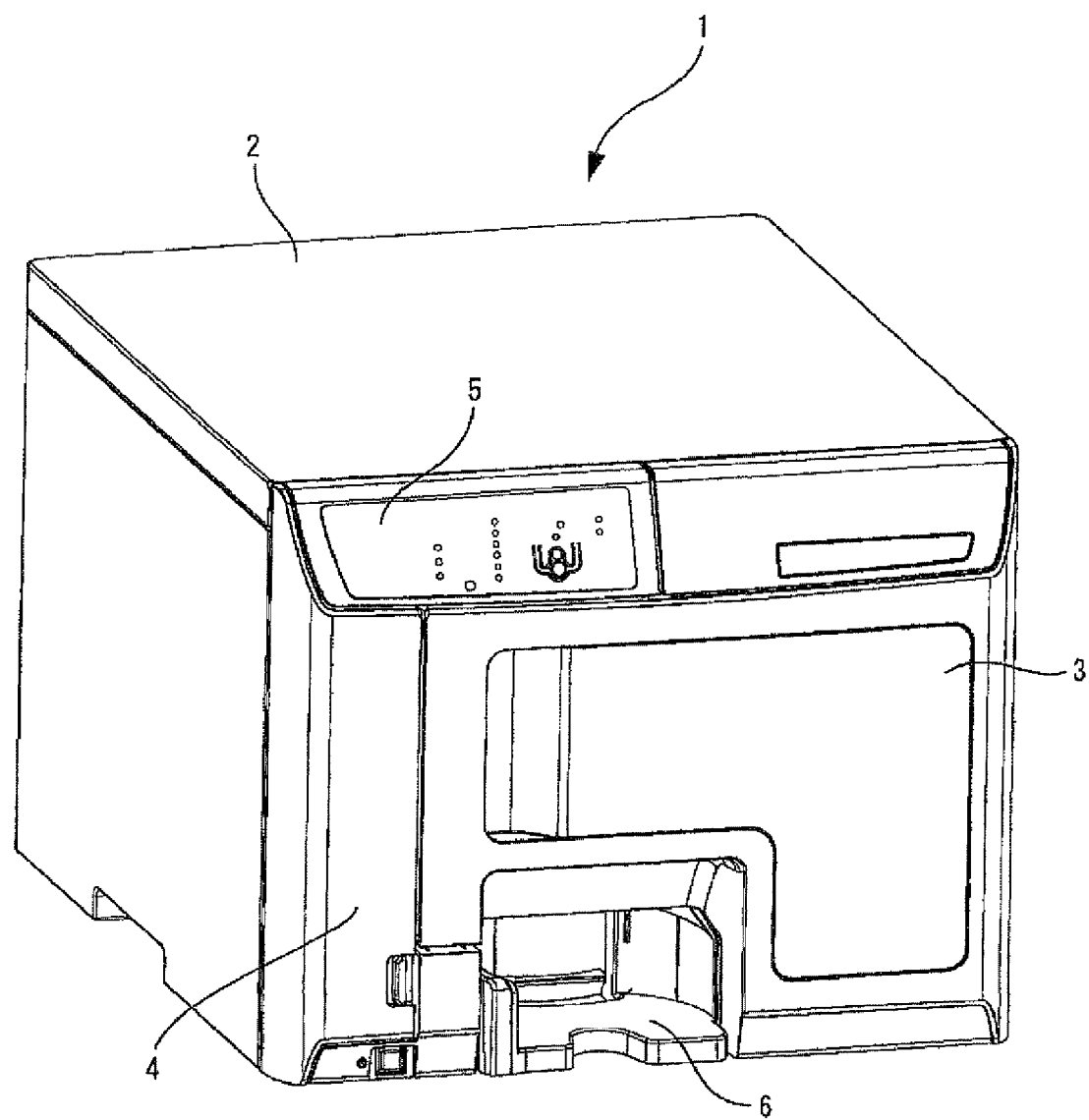
FIG. 1 is an external appearance perspective view of a publisher (media processor)

Referring to the drawings, an embodiment of a media processor having the media stacker of the present invention will be explained below.

In this embodiment, a media processor, which is a publisher, will be explained here as an example.

With reference to FIGS. 1-4, the publisher 1 is a media processor for writing data onto media such as CDs or DVDs and for conducting printing on label-faces of the media. The publisher 1 includes a case 2, the shape of which is a substantially rectangular parallelepiped. Opening and closing doors 3, 4, which can be opened and closed to the right and left, are attached on the front side of the case 2. In an upper side left end portion of the case 2, an operation panel 5, on which indicating lamps and operation buttons are arranged, is provided. A media discharge port 6 is provided at a lower end portion of the case 2.

The opening and closing door 3 arranged on the right in the front view is opened and closed when a blank media is set or when the finished media is taken out.

Figure 2:
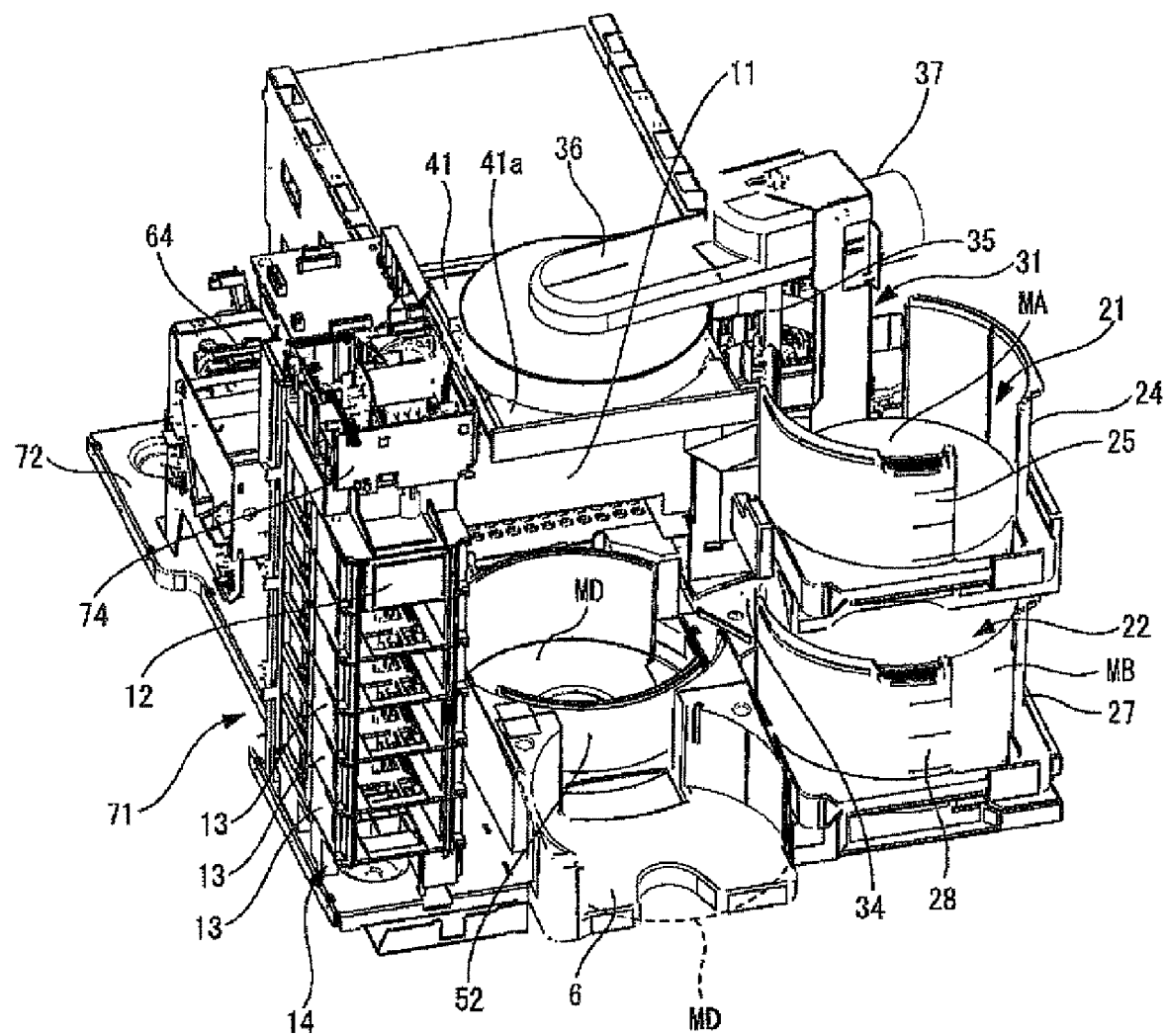
FIG. 2 is a perspective view showing a front side in a state in which a publisher case is removed.

As shown in FIG. 2, the opening and closing door 4 arranged on the left in the front view is opened and closed when an ink cartridge 12 of the label printer 11 (recording device) is replaced. When this opening and closing door 4 is opened, a cartridge attaching portion 14 having a plurality of cartridge holders 13 is exposed.

Figure 3:
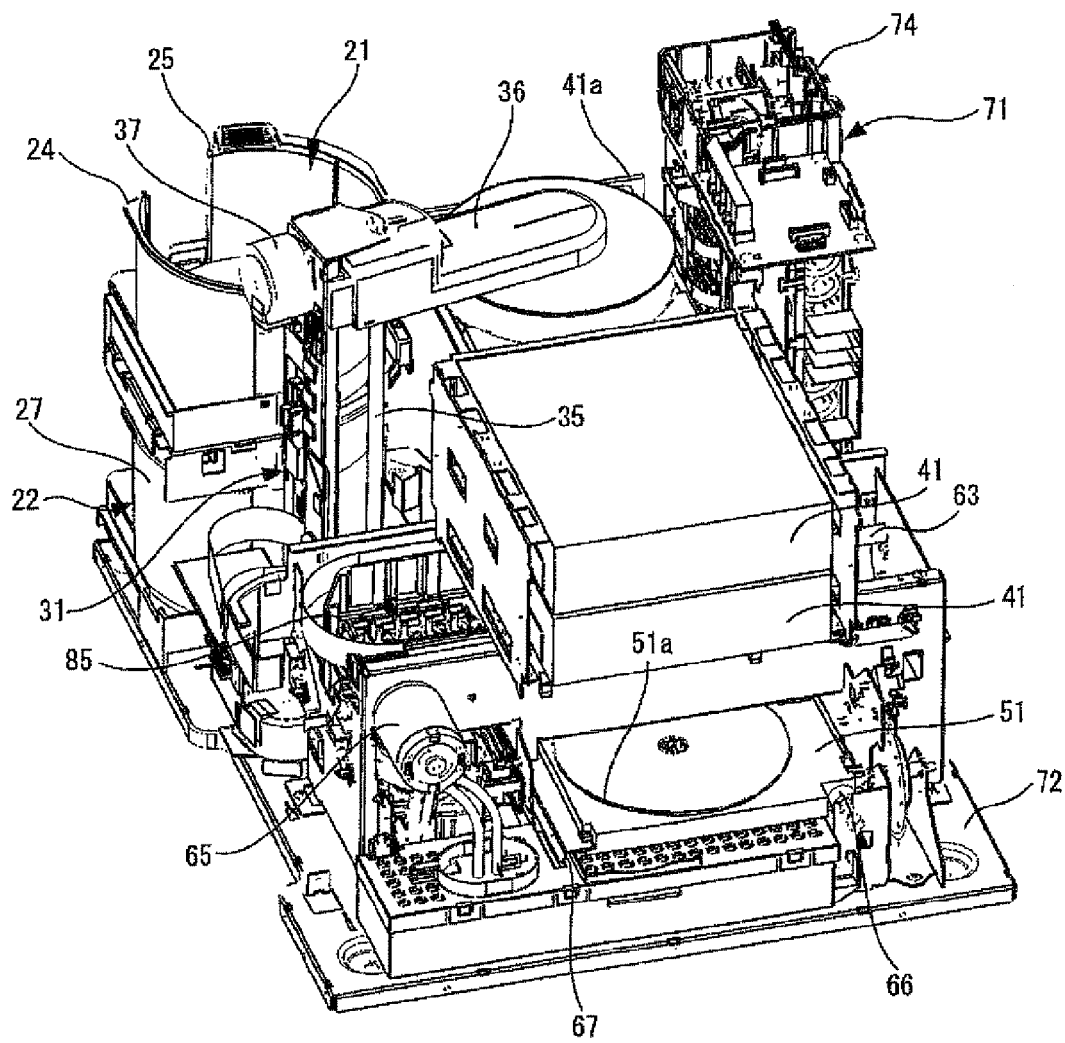
FIG. 3 is a perspective view showing a rear side in a state in which a publisher case is removed.

As shown in FIG. 3, inside the case 2 of the publisher 1, a blank media stacker 21, which is a media stacker capable of stacking a plurality of blank media MA, on which data has not been written yet, and a finished media stacker 22, which stores finished media MB, are coaxially arranged in the vertical direction.

The blank media stacker 21 includes a pair of right and left arcuate frame plates 24, 25. By these arcuate frame plates 24, 25, blank media MA are received from above and stacked on each other in the axial direction. When the opening and closing door 3 is opened and the stacker is taken out, the blank media MA can be easily accommodated or supplemented to the blank media stacker 21.

The finished media stacker 22, which is arranged on the lower side, is composed in the same manner as that described above. The finished media stacker 22 includes a pair of right and left arcuate frame plates 27, 28. The finished media MB are received from above and stacked on one another in the axial direction in the stacker.

It is possible to take out the finished media MB, which are media on which data have been written and label-face-printing has been completed, from the opening and closing door 3.

A media conveyance mechanism 31 is arranged on the rear side of the blank media stacker 21 and the finished media stacker 22. The media conveyance mechanism 31 includes: a horizontal support plate portion 34 attached to the base 72; a vertical guide shaft 35 vertically provided between the chassis composing a ceiling plate (not shown); and a conveyance arm 36 attached to the vertical guide shaft 35. The conveyance arm 36 can be elevated along the vertical guide shaft 35 by a drive motor 37 and rotated to the right and left around the vertical guide shaft 35. Media conveyed to the media discharge port 6 by the media conveyance mechanism 31 can be taken outside through the media discharge port 6.

Two media drives 41 are overlaid on each other in the vertical direction, are arranged on the side of the upper and lower stackers 21, 22 and the media conveyance mechanism 31. Under the media drives 41, a carriage 62 of the label-printer 11 (shown in FIG. 4) (described later) is movably arranged.

The media drives 41 respectively include a media tray 41a capable of moving between a data writing position, at which data is written on the media, and a media delivery position at which the media are received and delivered.

The label-printer 11 includes a media tray 51 capable of moving between a position at which label-printing can be conducted on label-faces of the media, and a media delivery position at which the media are received and delivered.

FIGS. 2 and 3 show a state in which a media tray 41a of the upper side media drive 41 is drawn out to the user's side and located at the media delivery position and also show a state in which a media tray 51 of the lower side label printer 11 is located at the label-printing position on the inner side. The label printer 11 is preferably an ink jet printer. The ink supply mechanism 71 includes ink cartridges 12 of various colors. In the present embodiment, six colors of black, cyan, magenta, yellow, light cyan and light magenta are used. The ink cartridges 12 are attached from the front side to the cartridge holders 13 of the cartridge attaching portion 14.

A gap is formed between a pair of frame plates 24, 25 of the blank media stacker 21 and between a pair of frame plates 27, 28 of the finished media stacker 22. The gap enables a conveyance arm 36 of the media conveyance mechanism 31 to be elevated. Between the blank media stacker 21 and the finished media stacker 22, another gap is formed so that the conveyance arm 36 of the media conveyance mechanism 31 can be horizontally rotated and located right above the finished media stacker 22. When the media tray 41a is pushed into the media drive 41, the conveyance arm 36 of the media conveyance mechanism 31 is lowered. Therefore, the conveyance arm 36 of the media conveyance mechanism 31 can have access to the media tray 51 located at the media delivery position. Accordingly, the conveyance arm 36 can convey the media to appropriate positions.

A stacker 52 for the media to be discarded, in which the media MD to be discarded are stored, is arranged in a lower portion of the media delivery position of the media tray 51. In the discarded media stacker 52, for example, about 30 media MD to be discarded can be stored. Under the condition that the media tray 51 is withdrawn from the media delivery position in the upper portion of the stacker 52 to the printing position, the media MD to be discarded can be supplied to the stacker 52 by a conveyance arm 36 of the media conveyance mechanism 31.

As a summary of the conveyance motion, the media such as CDs or DVDs are conveyed among the blank media stacker 21, the finished media stacker 22, the discarded media stacker 52, the media tray 41a of the media drive 41, and the media tray 51 of the label printer 11 by the conveyance arm 36 of the media conveyance mechanism 31.

Next, the constitution of the label printer 11 will be explained below.

Figure 4:
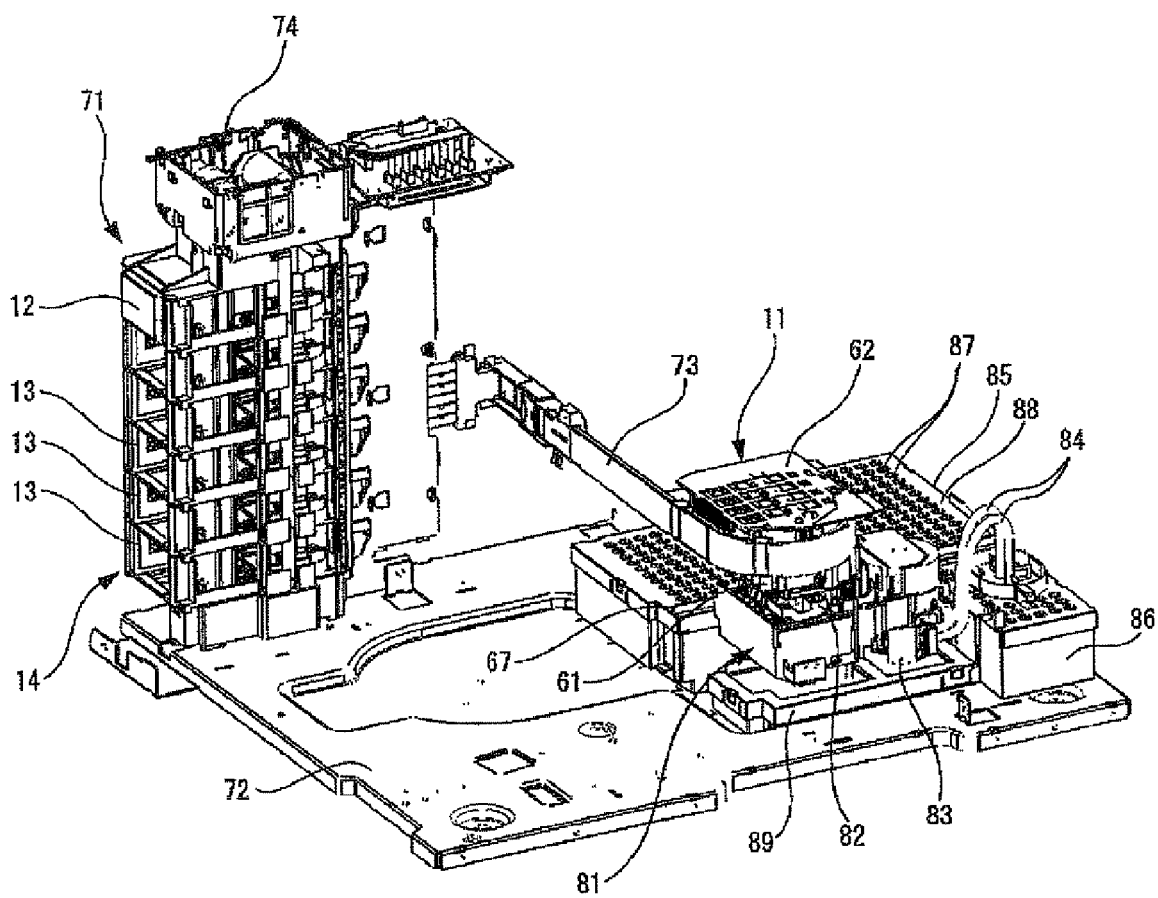
FIG. 4 is a perspective view showing a recording device portion arranged in a publisher.

As shown in FIGS. 2 to 4, the label printer 11 includes a carriage 62 having an ink jet head 61. The carriage 62 is supported along the carriage guide shaft 63 so that the carriage 62 can be reciprocated in the horizontal direction. The carriage 62 includes: a timing belt 64 horizontally provided along the carriage guide shaft 63; and a carriage motor 65 for driving the timing belt 64.

The ink jet head 61 mounted on the carriage 62 is arranged such that the nozzle face is directed downward. At the lower side position of the ink jet head 61, the media tray 51 can be horizontally reciprocated in the longitudinal direction. A right end of the media tray 51 is supported by the guide shaft 66 horizontally extending in the longitudinal direction. A left end of the media tray 51 is slidably supported by the guide rail 67 horizontally extending in the longitudinal direction. The drive mechanism of the media tray 51 includes: a timing belt (not shown) horizontally provided in the longitudinal direction; and a tray motor for driving the timing belt.

The label printer 11 includes an ink supply mechanism 71 having a cartridge attaching portion 14 to which the ink cartridge 12 is attached. The ink supply mechanism 71 has a longitudinal structure and is arranged on the base 72 of the publisher 1 in the vertical direction. One end of the flexible ink supply tube 73 is connected to the ink supply mechanism 71. The other end of the flexible ink supply tube 73 is connected to the carriage 62.

Ink is supplied from the ink cartridge 12 of the ink supply mechanism 71 to the carriage 62 through the ink supply tube 73. Ink is supplied to the ink jet head 61 through a damper unit and a back pressure adjustment unit (not shown) which are arranged in the carriage 62.

A pressurizing mechanism 74 is arranged in an upper portion of the ink supply mechanism 71. The pressurizing mechanism 74 supplies pressure to the ink cartridge 12 so that ink stored in an ink pack provided in the ink cartridge 12 can be sent out.

An ink suction mechanism 81 is provided on the lower side at the home position (shown in FIG. 4) of the carriage 62. The ink suction mechanism 81 includes: a cap 82 for covering nozzles of the ink jet head 61 exposed on the lower face of the carriage 62 arranged at the home position; and a waste ink suction pump 83 for sucking waste ink discharged into the cap 82 by the head cleaning operation or the ink charging operation conducted on the ink jet head 62.

Waste ink sucked by the waste ink suction pump 83 of the ink suction mechanism 81 is sent into a waste ink absorption tank 85 through a tube 84.

The waste ink absorption tank 85 is composed such that absorbing material 104 (described later) is arranged in the case 86. An upper face of the waste ink absorption tank 85 is covered with a cover 88 having a plurality of ventilation holes 87.

A waste ink receiving portion 89, which is a portion of the waste ink absorption tank 85, is provided in a lower portion of the waste ink suction mechanism 81. The waste ink receiving portion 89 receives drops of waste ink dripping from the waste ink suction mechanism 81 and absorbs the waste ink with the absorbing material.

On the media tray 51, a circular protruding portion 51a, on which the media are placed, is provided on an upper face of a rectangular plate. At the center of the protruding portion 51a, three engaging portions (not shown) are provided on a concentric circle at the regular interval of 120°. The three engaging portions can be integrally moved in the radial direction. Therefore, when the media tray 51 is moved to the media delivery position, the three engaging portions can be moved by a cam mechanism (not shown).

When a medium is dropped from an upper position into the recess portion 51a with the label face upward, on which a label is printed, the three engaging portions are inserted into the center hole of the medium. When the three engaging portions are moved outward in the radial direction, the three engaging portions are pushed from the inside to the inner circumferential face of the center hole of the medium. The medium is thus held on the media tray 51. In this state, a tray motor (not shown) is driven, and the media tray 51 is moved to the rear side along the guide shaft 66, so that the media tray 51 can be moved into a printing region of the ink jet head 61. Subsequently, printing can be conducted on the label face of the medium by the ink jet head 61.

Next, the stacker 52 for the media MD to be discarded, which is arranged on the side of the blank media stacker 21 and the finished media stacker 22, will be described in detail. Further, a media discharge port 6, to which the media MD to be discarded or the finished media MB are sent, will also be described in detail. In the following description, the media MD to be discarded and the finished media MB will be referred to as media M.

Figure 5:
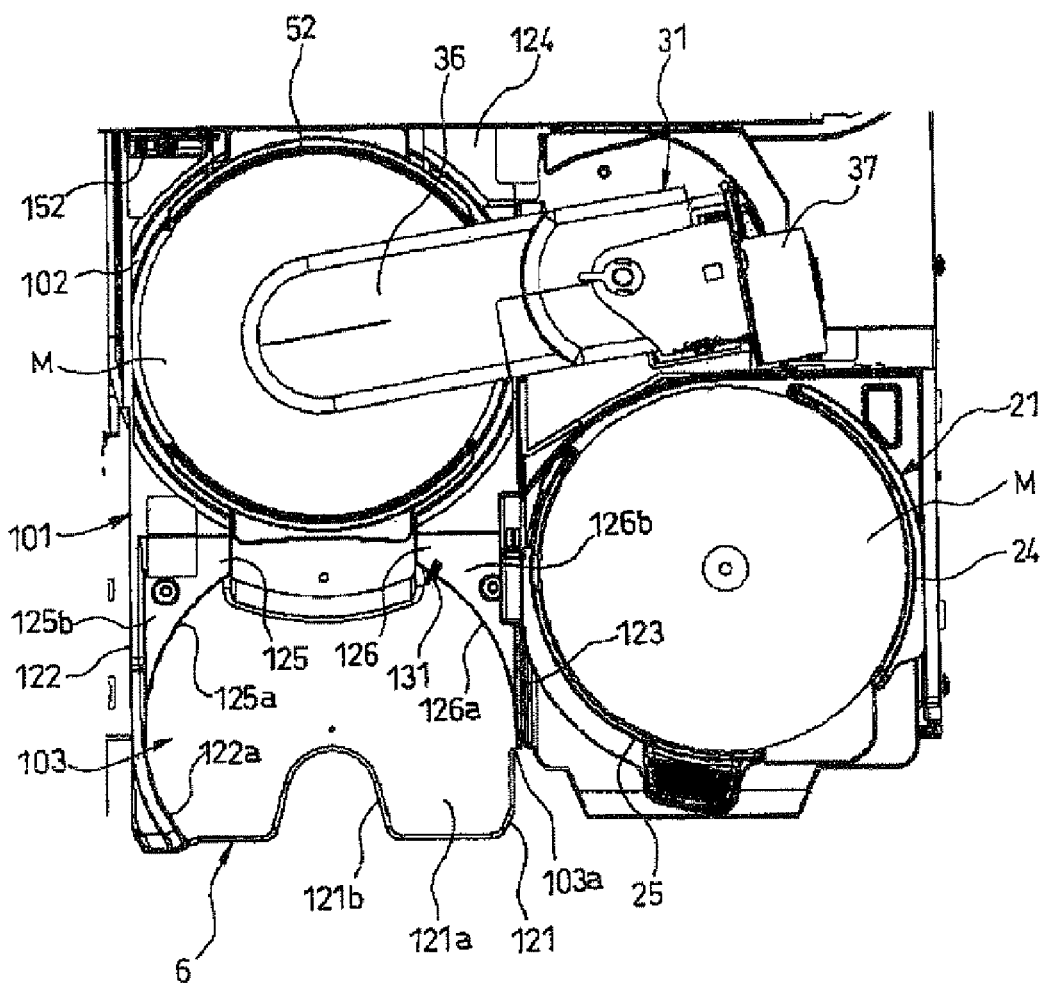
FIG. 5 is a plan view showing an internal structure of a publisher.

FIG. 5 is a plan view showing the inside of the publisher.

As shown in FIG. 5, a stacker tray (media stacker) 101 is arranged on the side of the portion in which the blank media stacker 21 and the finished media stacker 22 are arranged in the vertical direction. On the rear side of this stacker tray 101, the stacker 52 for the media to be discarded is detachably attached. A media stacker portion 103 for discharging, which is exposed to the media discharge port 6, is formed on the front side of the stacker tray 101.

The stacker 52 for the media to be discarded and the media stacker portion 103 for discharging can accommodate the media M in such a manner that the media M are overlaid on each other in the thickness direction. For example, the discarded media stacker 52 can accommodate 30 media M, and the media stacker portion 103 for discharging can accommodate 20 media M.

In the same manner as that of the blank media stacker 21 and the finished media stacker 22, the stacker 52 is arranged on a conveyance passage of the media M conveyed by the rotating conveyance arm 36. Therefore, by the elevating conveyance arm 36, the media M can be conveyed to the stacker 52.

The media stacker portion 103 for discharging is arranged on the user's side of the discarded media stacker 52 adjacent the stacker 52. That is, the media stacker portion 103 for discharging is arranged at a position out of the rotation locus of the conveyance arm 36. When the media M is sent out to the media stacker portion 103 for discharging, the media tray 51 of the label printer 11 is used.

The following is a description of a sending action of sending the media M to the media stacker portion 103 for discharging when the media tray 51 is used.

Figure 6:
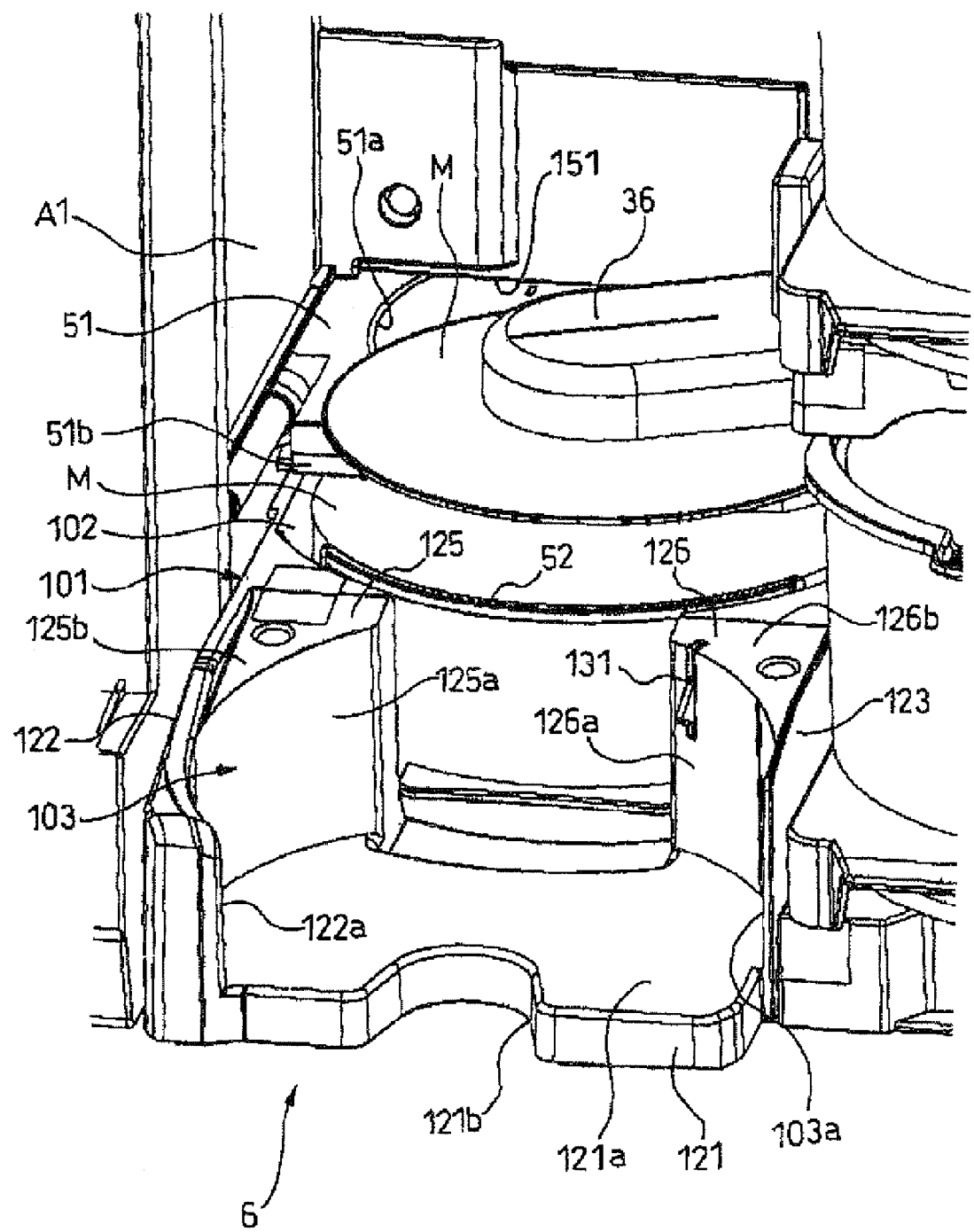
FIGS. 6-8 are perspective views for explaining a method of discharging media into a media stacker portion for discharging.
Figure 7:
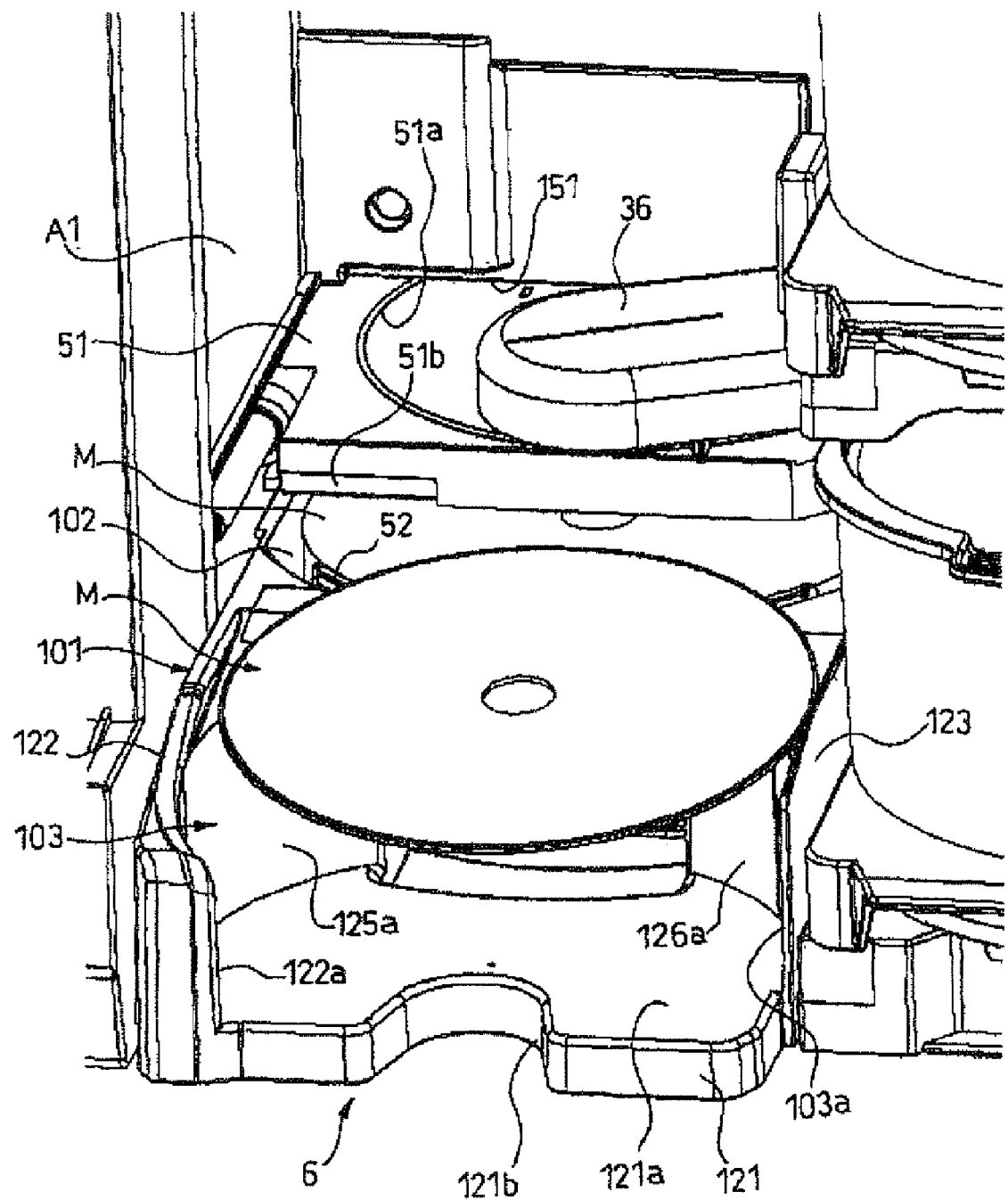
Figure 8:
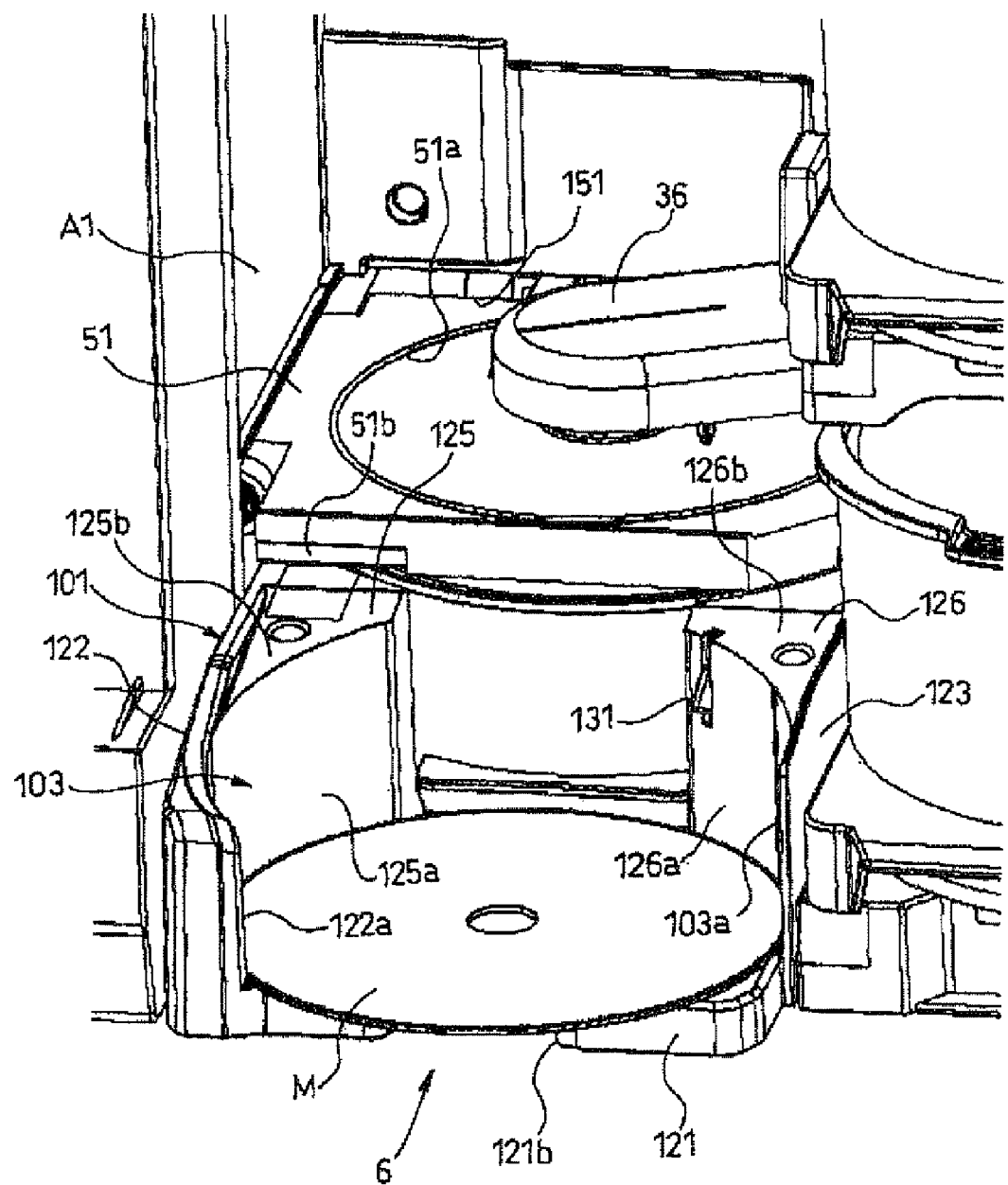

FIGS. 6 to 8 are perspective views for explaining a method of discharging the media into the media stacker portion for discharging.

When the media M are accommodated in the media stacker portion 103 for discharging, under the condition that the medium M is held by the conveyance arm 36, the conveyance arm 36 is rotated to a position on the user's side by about 15° with respect to a position right above the discarded media stacker 52.

Next, as shown in FIG. 6, the media tray 51 of the label printer 11 is moved to the user's side to a position crossing the substantial center of the discarded media stacker 52. In this state, the medium M held by the conveyance arm 36 is released and dropped.

As a result, as shown in FIG. 7, when the dropping medium M comes into contact with the media tray 51 arranged on the upper side of the stacker tray 101, the medium M is inclined downward toward the front side of the processor and guided to the media stacker portion 103 for discharging. Therefore, the medium M slides and drops into the media stacker portion 103 for discharging.

As shown in FIG. 8, the media tray 51 of the label printer 11 is further moved to the front side of the processor. As a result, the medium M, which has not dropped into the media stacker 103 for discharging and has been staying on the stacker tray 101, is pushed out onto the side of the media stacker 103 for discharging by the media tray 51. Therefore, the medium M can be positively accommodated in the media stacker 103 for discharging.

Next, the structure of the stacker tray and the media discharging port will be described in detail.

Figure 9:
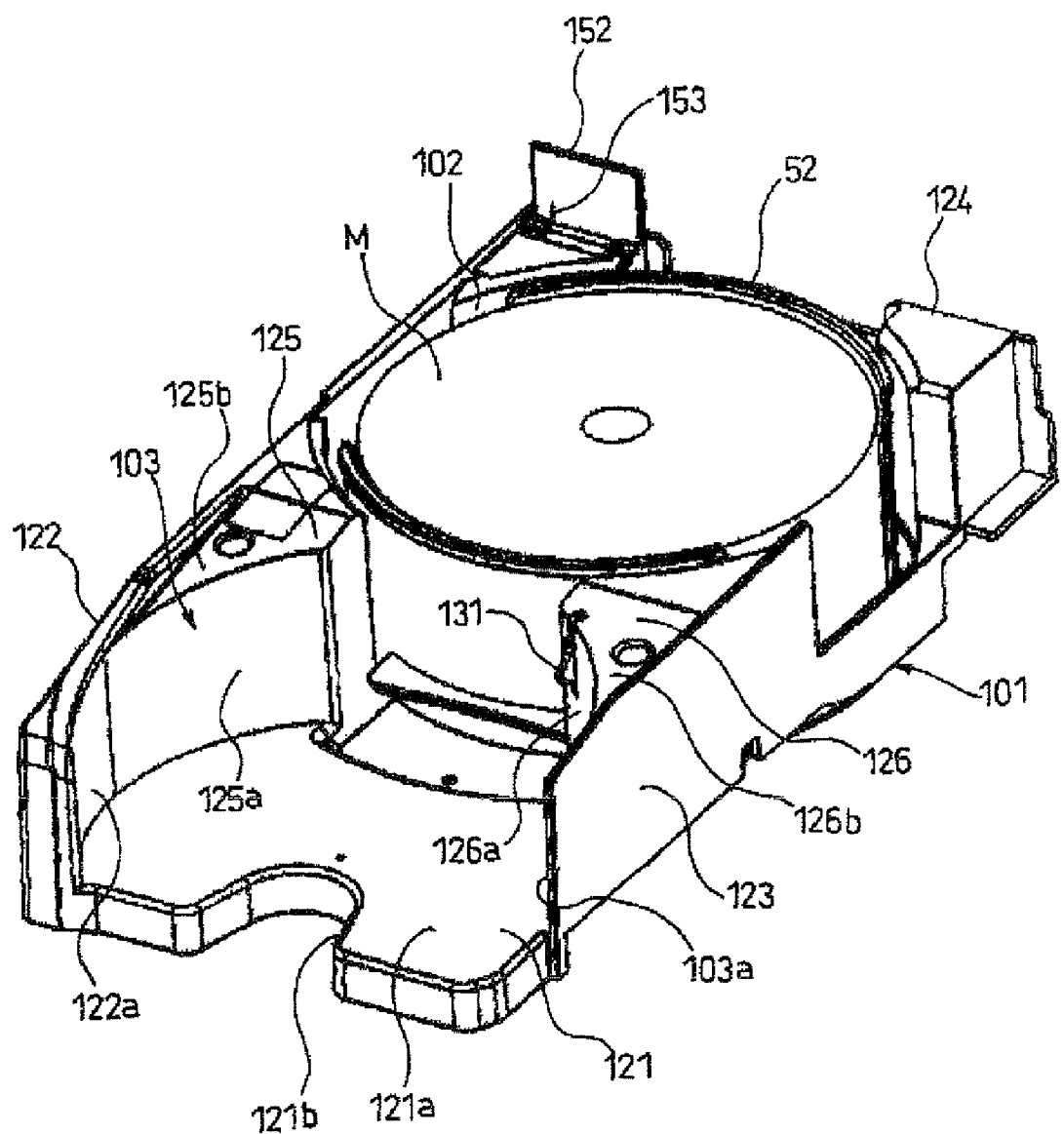
FIG. 9 is a perspective view showing a stacker tray.
Figure 10:
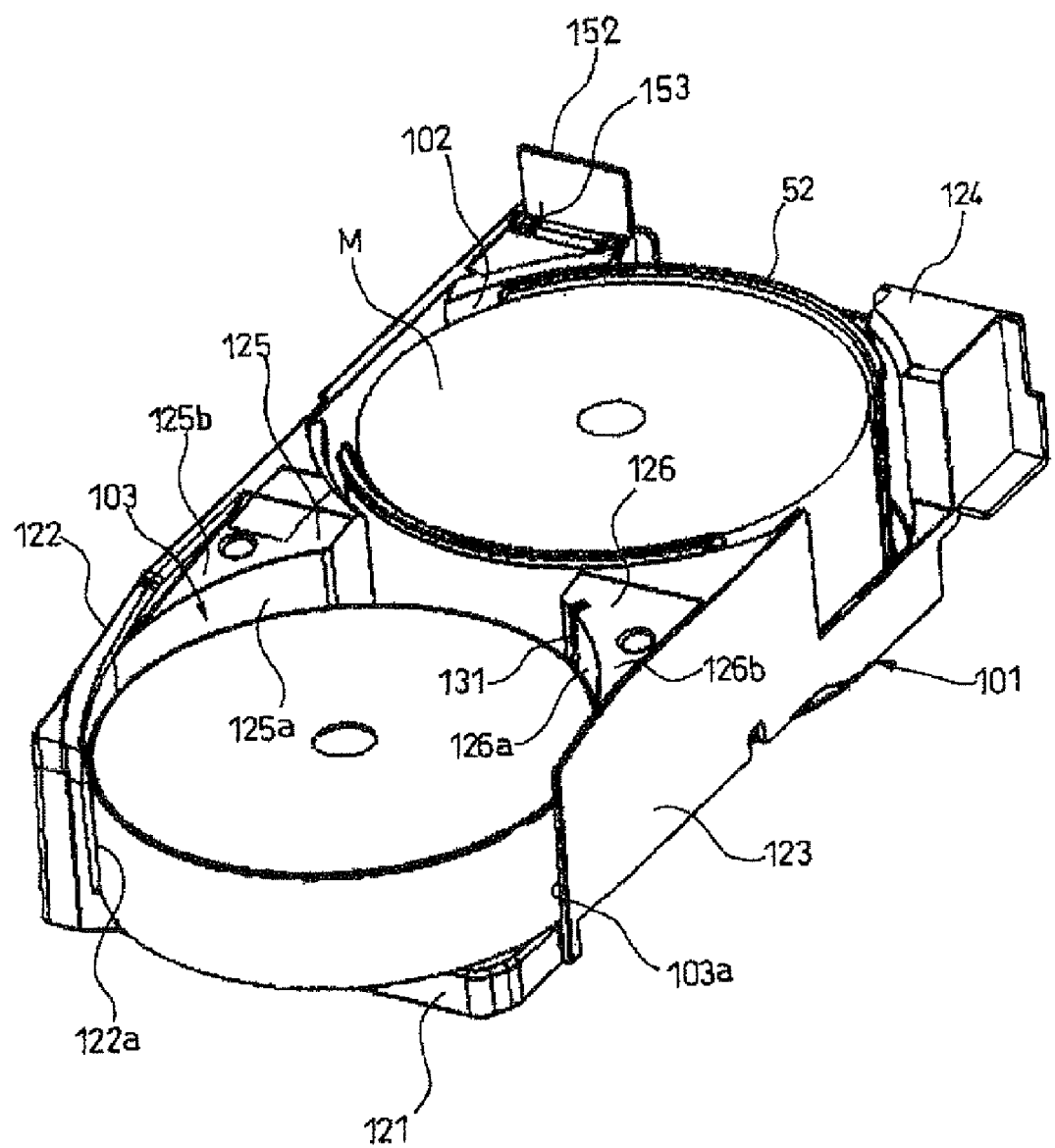
FIG. 10 is a perspective view showing a stacker tray.

As shown in FIGS. 9 and 10, a recess portion 102 for attaching the stacker is formed on the rear side of the stacker tray 101. The discarded media stacker 52 is detachably attached to the recess portion 102 for attaching the stacker. When the stacker 52 is attached to and detached from this recess portion 102 for attaching the stacker, the medium M can be easily taken out.

The stacker tray 101 is preferably made of resin. The stacker tray 101 includes: a bottom plate portion 121; side wall portions 122, 123 extending from both sides of the bottom plate portion 121; and an end plate portion 124 from which a rear end edge of the bottom plate portion 121 extends. Substantially trapezoidal partitioning portions 125, 126 are protruded inward in an intermediate portion in the longitudinal direction of the right and left side walls 122, 123.

A recess portion 102 for attaching a stacker, the shape of which is circular in a plan view, is formed between the end plate portion 124 and the partitioning portions 125, 126 between the right and left side walls 122, 123.

Side faces on the user's side of the right and left partitioning portions 125, 126 are formed into arcuate guide faces 125a, 126a which rise substantially perpendicularly by a draft of 0.5□. An arcuate guide face 122a, which smoothly continues to the arcuate guide face 125a of the left partitioning portion 125, is formed on the left side wall portion 122. The arcuate guide faces 125a, 126a are used for regulating movement of the medium M when an outer circumferential portion of the medium M to be accommodated comes into contact with the arcuate guide faces 125a, 126a. The arcuate guide faces 125a, 126a guide the medium M while a small gap is formed from the outer circumferential portion of the medium M. An end portion on the opening portion 103a side of the arcuate guide face 122a is reduced as compared with the locus of the arcuate guide face 125a so that the medium M can come close to the media-full detection sensor 131 arranged at an opposed position.

Also, the user's side of the right side wall is cut out in the vicinity of the end portion of the arcuate guide face 126a of the right partitioning portion 126.

A space portion, which is surrounded by the arcuate guide faces 125a, 126a of the right and the left partitioning portions 125, 126, the arcuate guide face 122a of the left side wall portion 122 and the flat bottom face portion 121a on the front side of the bottom plate portion 121, is formed into the media stacker portion 103 for discharging.

Concerning the media stacker 103 for discharging, a large opening portion 103a is disposed between the end portion on the user's side of the right side wall portion 123 which is cut out and the end portion on the user's side of the left side wall portion 122 in which the arcuate guide face 122a is formed. A portion of the accommodated medium M is protruded from the opening portion 103a and exposed to the media discharge port 6. Accordingly, the medium M, which has been discharged to the media stacker portion 103 for discharging, can be picked up at the media discharge port 6. In the end portion on the user's side of the left side wall portion 122, a height of the arcuate guide face 122a is set at substantially the same height as that of the upper face of the medium M located in the uppermost portion at the time of laminating the media M, the accommodation number of which is maximum (20 pieces) when the media M are accommodated in the stacker portion 103.

Upper faces of the right and left partitioning portions 125, 126 of the stacker tray 101 are formed into inclined guide faces 125b, 126b which are inclined forward. When the medium M, which has dropped from the conveyance arm 36, slides down on the inclined guide faces 125b, 126b, the medium M is guided to the media stacker portion 103 for discharging.

Figure 11:
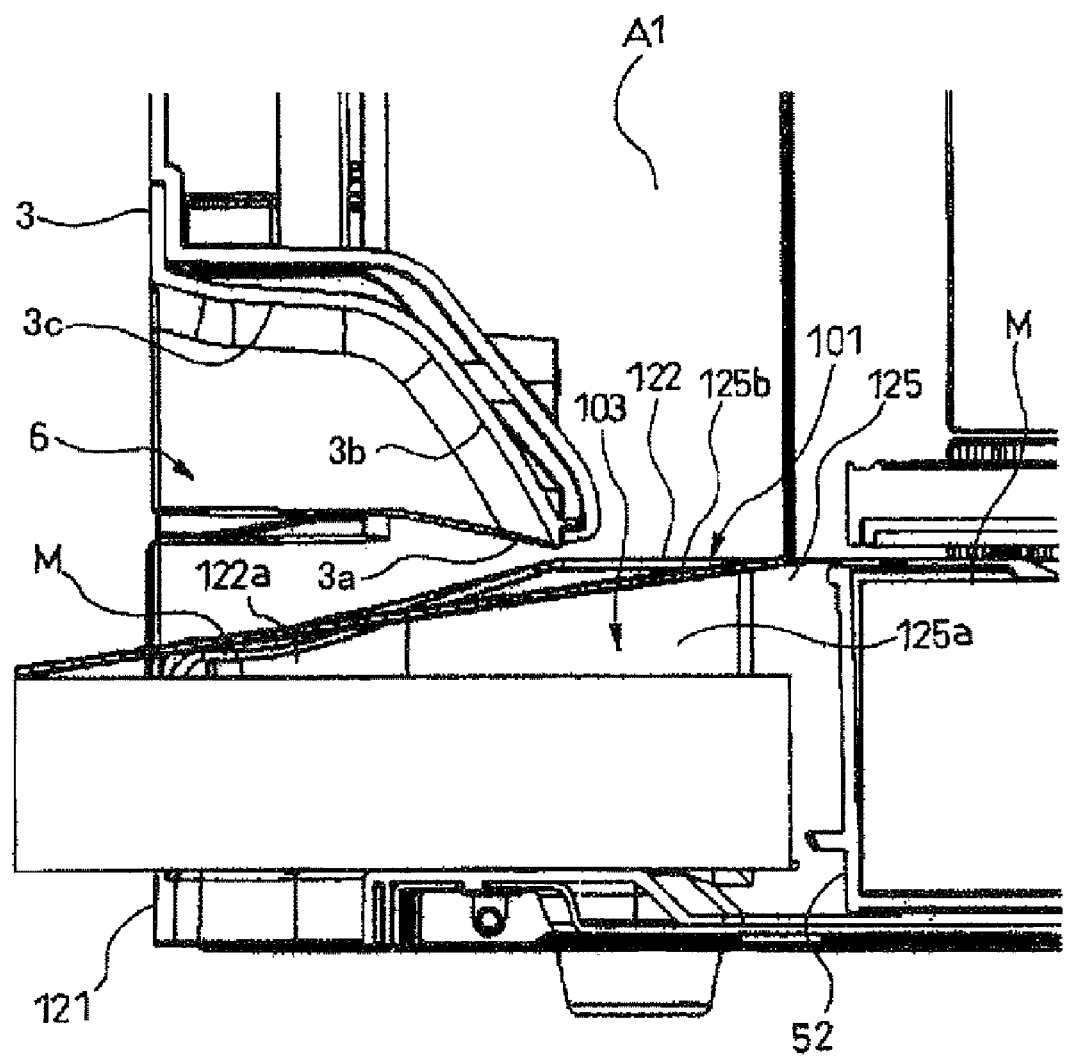
FIG. 11 is a sectional view taken at a media discharge port.

As shown in FIG. 11, projections of the inclined guide faces 125b, 126b to the forward end side cross each other for the first time at the edge portion (the left end in FIG. 11) on the guide direction side of the medium M at the upper end portion of the media stacker 103 for discharging.

As a result, the medium M, which slides down along the inclined guide faces 125b, 126b, is prevented from coming into contact with an upper face of the uppermost medium M of the media M laminated and accommodated in the media stacker portion 103 for discharging. Accordingly, the sliding medium M is not hooked at the upper face of the media M accommodated in the media stacker portion 103 for discharging. Therefore, the sliding medium M can be laminated on the media M accommodated in the media stacker portion 103 for discharging.

Figure 12:
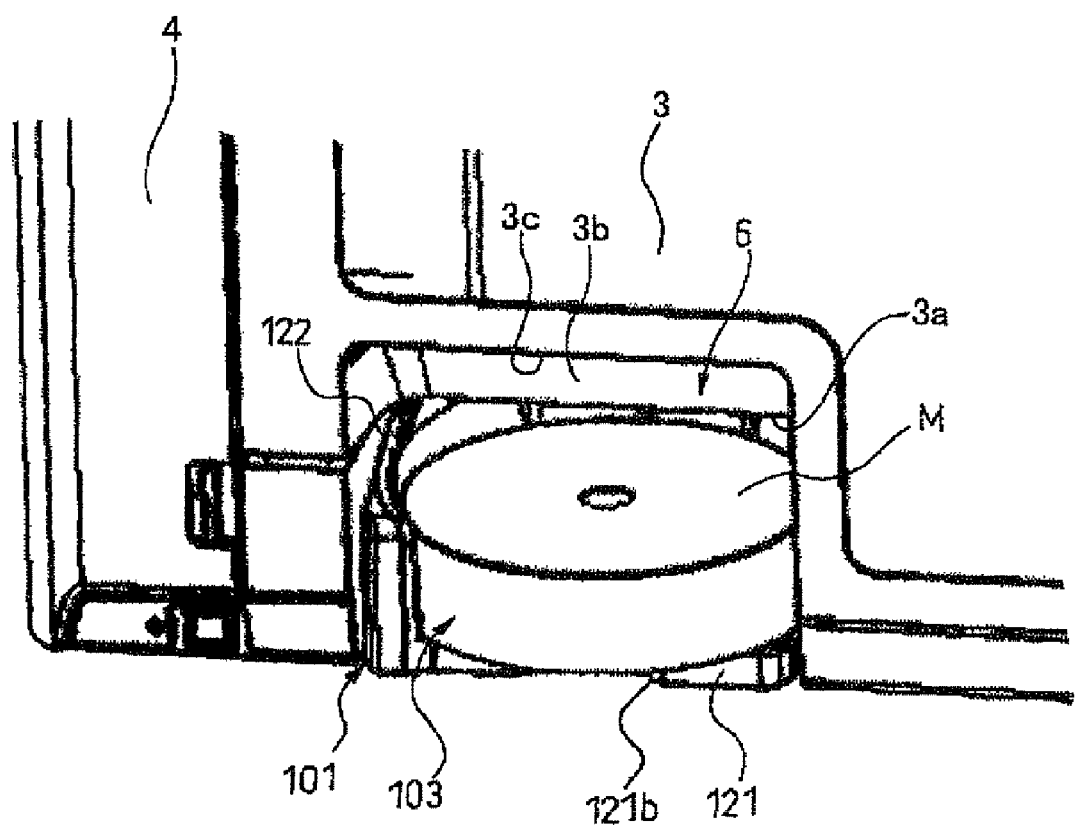
FIG. 12 is a perspective view showing a discharging state of media at a media discharge port.

As shown in FIG. 12, a cutout portion 3a for avoiding interference with the media stacker portion 103 for discharging is formed at a lower end portion of the opening and closing door 3 of the publisher 1. At the time of closing the opening and dosing door 3, the cutout portion 3a functions as a media discharge port 6.

A recess portion 3c having an inclined face 3b, which gradually inclines to the inner side of the processor from the upper portion to the lower portion, is formed in an upper portion of the media stacker portion 103 for discharging in the cutout portion 3a.

With this structure, when a user holds the media M, which are laminated and accommodated in the media stacker portion 103 for discharging, the media M are picked up at the media discharge port 6, and the user lifts up the media M onto the recess portion 3c side and pulls up the media M along the inclined face 3b such that the media M can be easily taken out.

A recess portion 121b is formed in the central portion in the width direction in an end portion on the user's side of the bottom plate portion 121 forming the media stacker portion 103 for discharging. When the media M is taken out from the media stacker portion 103 for discharging, the media M can be easily held when the user reaches with fingers into the recess portion 121b.

Figure 13:
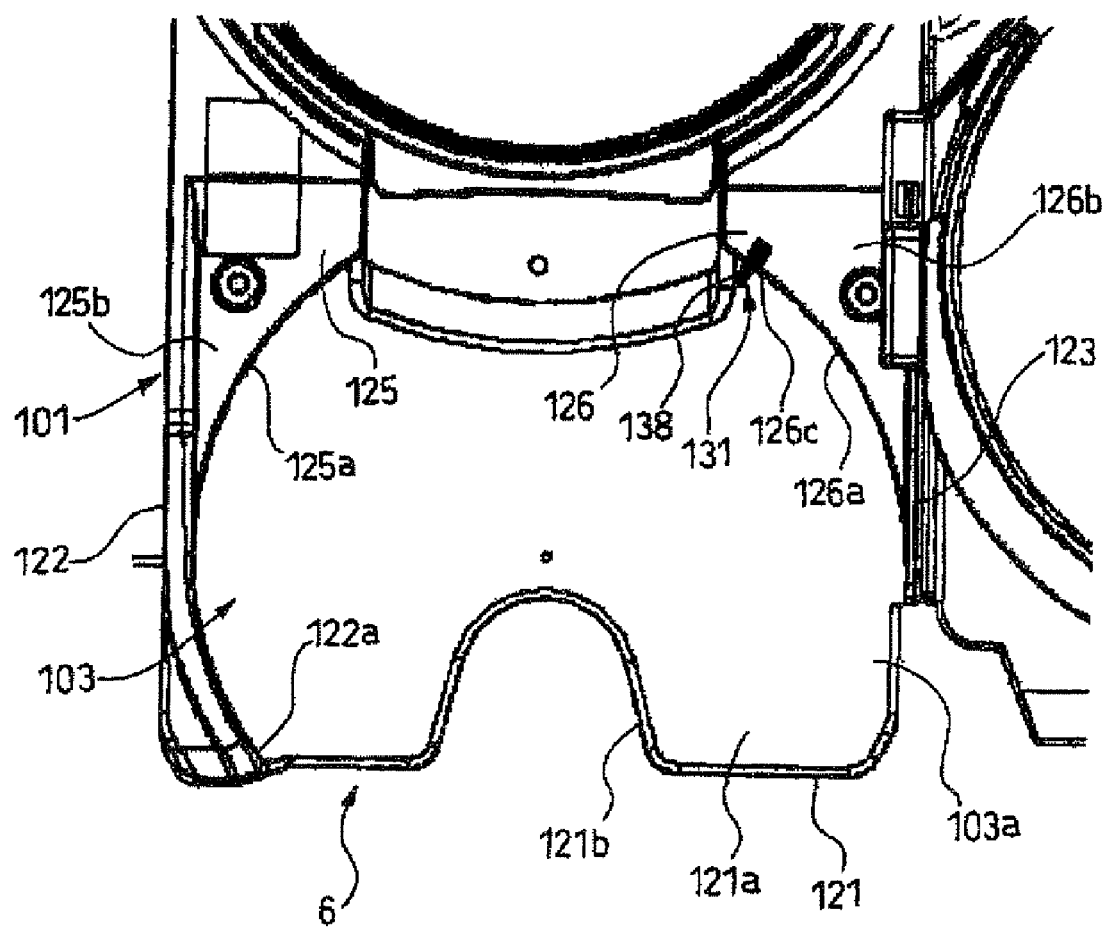
FIG. 13 is a plan view showing a shape of a media stacker portion for discharging.

As shown in FIG. 13, a media-full detection sensor 131 is arranged in the media stacker portion 103 for discharging, at an opposed position of the arcuate guide face 122a at the forward end of the side wall 122 on the left of the stacker tray 101

Figure 14:
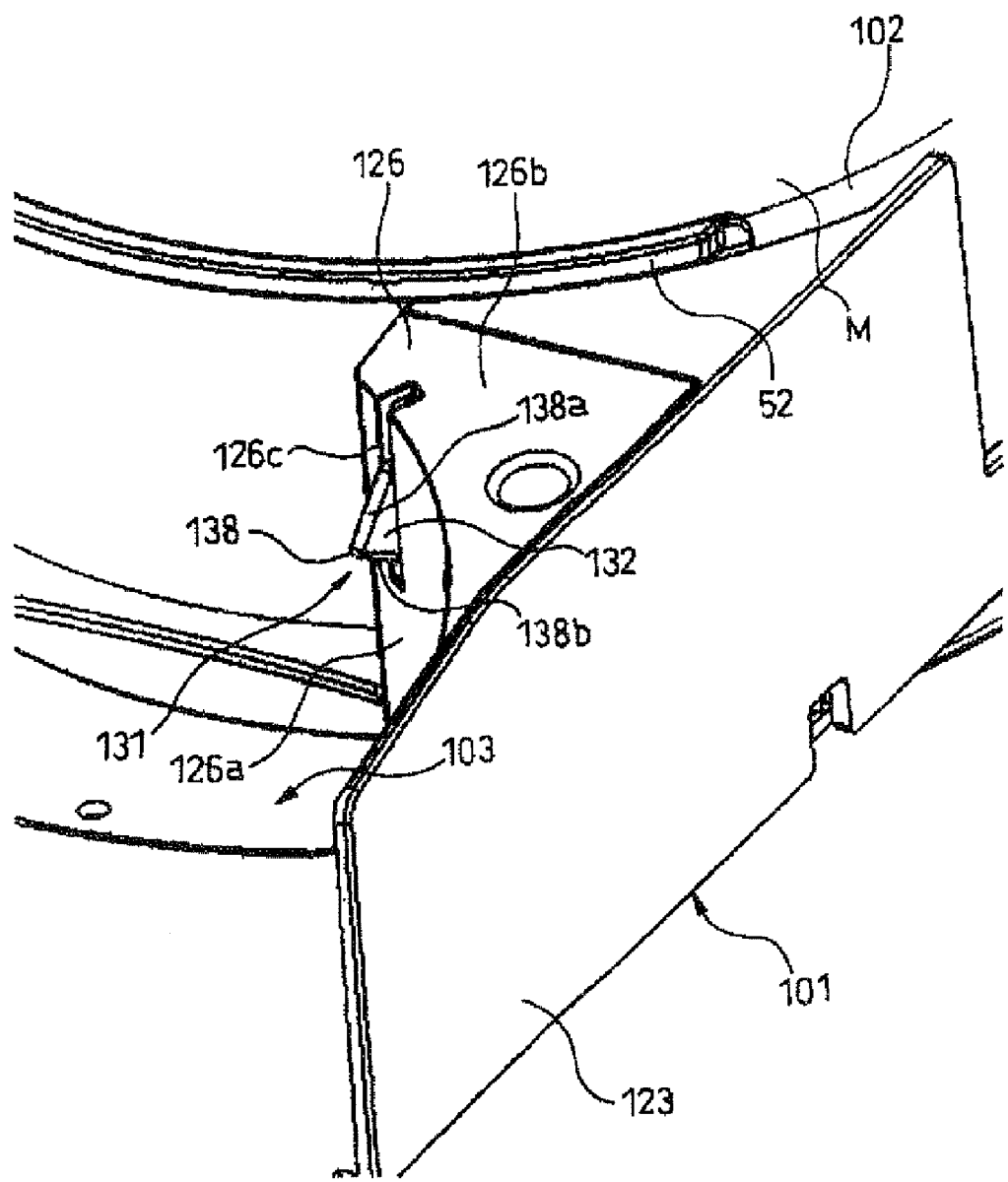
FIG. 14 is a perspective view showing a media-full detection sensor of a media stacker portion for discharging.

As shown in FIG. 14, the media-full detection sensor 131 is arranged in the partitioning portion 126 on the right of the stacker tray 101. The media-full detection sensor 131 detects that the number of the accommodated media M has reached a maximum number.

Figure 15:
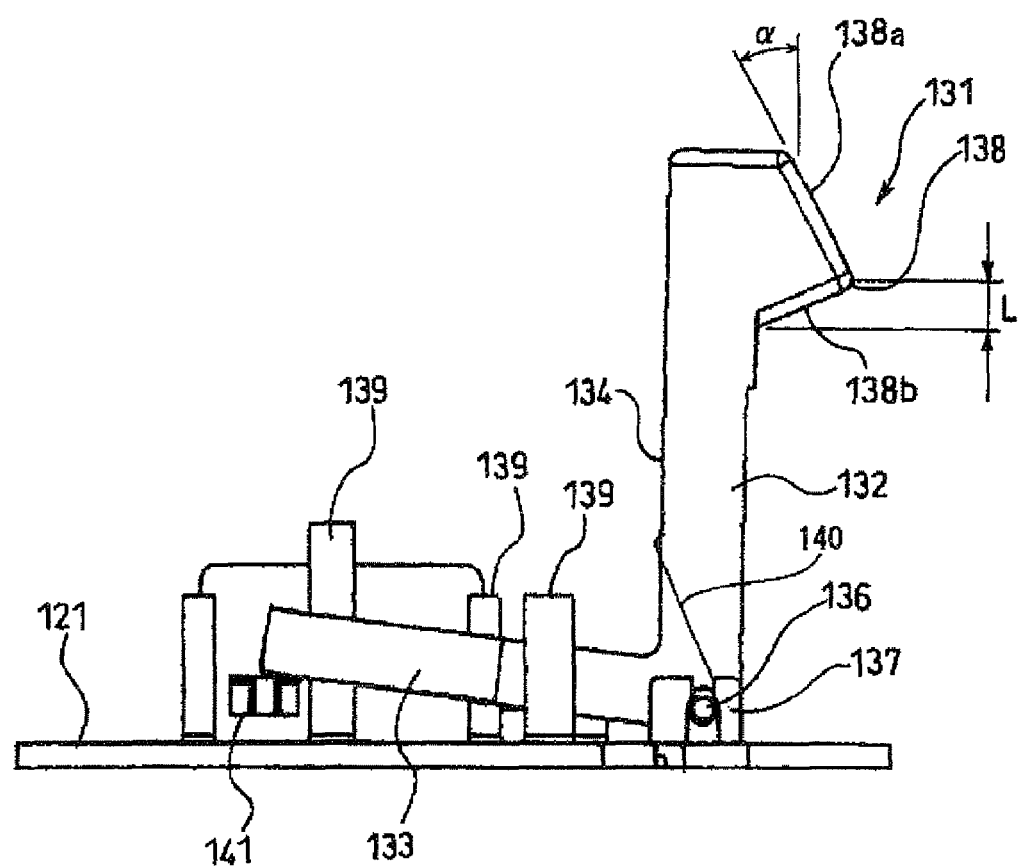
FIG. 15 is a side view showing a structure of a media-full detection sensor.

As shown in FIG. 15, the media-full detection sensor 131 is provided with an L-shaped lever 134 having an operation arm 132 and an action arm 133. A pin 136 is formed in the lever 134 at a connecting portion of connecting the operation arm 132 with the action arm 133. The pin 136 protrudes to the right and left. The pin 136 is held by the supporting portion 137 formed on the bottom plate portion 121 of the stacker tray 101. The lever 134 is thus held so that it can be rotated round the pin 136.

A protruding portion 138 protruding to the side is formed at a forward end portion of the operation arm 132 of the lever 134. The protruding portion 138 protrudes into the media stacker 103 for discharging from the window portion 126c which is an opening portion formed on the arcuate guide face 126a of the partitioning portion 126.

A height of the protruding portion 138 from the bottom plate portion 121 is substantially the same as the height of the upper face of the uppermost medium M of the media M, the accommodation number of which is the maximum that can be accommodated in the media stacker portion 103 for discharging.

An upper side of the protruding portion 138 is formed into an upper inclination face 138a, the protrusion of which is gradually decreased when it comes to the upper side. A lower side of the protruding portion 138 is formed into a lower inclination face 138b, the protrusion of which is sharply decreased when it comes to the lower side. In other words, the upper side of the protruding portion 138 is formed into the upper inclination face 138a which is upwardly inclined toward the arcuate guide face 126a, and the lower side of the protruding portion 138 is formed into the lower inclination face 138a which is downwardly inclined toward the arcuate guide face 126a. A height L of the lower inclination face 138b is substantially the same as the thickness of one medium M.

When the action arm 133 of the lever 134 is separated from the pin 136 of the support portion 137, the action arm 133 is gradually inclined upward. On both sides of the action arm 133, the action ram 133 is guided on the guide piece 139, which extends from the bottom plate portion 121.

An optical sensor portion 141 is arranged on the side of the action arm 133. When the lever 134 is rotated, the sensor portion 141 is turned off by the arm 133. A detection signal of the sensor portion 141 is transmitted to the control unit (control means) incorporated into the processor.

In this structure, the medium M, which is guided along the inclined guide faces 125b, 126b and dropped into the media stacker portion 103 for discharging, comes into contact with the upper inclination face 138a of the protruding portion 138 of the lever 134.

Since the upper inclination face 138a of the protruding portion 138 is formed with a face which is gently inclined with respect to a moving direction of the medium M, when the medium M enters the media stacker portion 103 for discharging, the protruding portion 138 does not obstruct movement of the medium M. The protruding portion 138 is pushed in the withdrawal direction, so that the medium M can be smoothly sent into the media stacker portion 103 for discharging.

Figure 17:
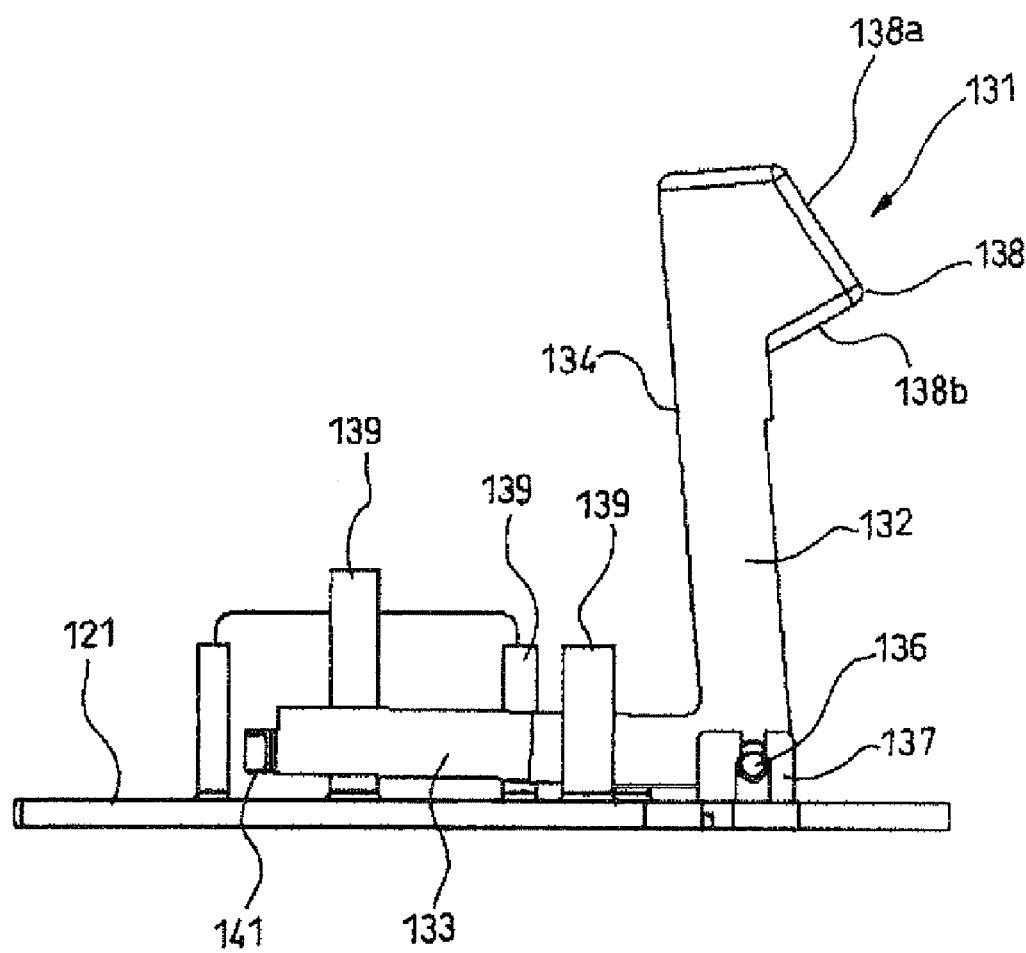
FIG. 17 is a side view for explaining an action of a media-full detection sensor.

When the protruding portion 138 of the lever 134 is pushed in the withdrawal direction by the medium M, the lever 134 is rotated counterclockwise in FIG. 15, and the sensor portion 141 is turned off as shown in FIG. 17.

When the height of the media M is not less than a predetermined height, when the media M fall to the lower side of the lower inclination face 138b of the protruding portion 138, the lever 134 is rotated clockwise by a twist coil spring 140 so that the protruding portion 138 can protrude to the media stacker 103 side. Therefore, as shown in FIG. 15, the sensor portion 141 is turned on again.

When the control unit receives a detection signal from the sensor portion 141, when a period of time from when the sensor portion 141 is changed over from ON to OFF to when the sensor portion 141 is changed to ON again is not more than a predetermined period of time, it is judged that the media M have passed through the media-full detection sensor 172. Therefore, it is judged that the height of the accommodated media M is not at the maximum height.

Figure 16:
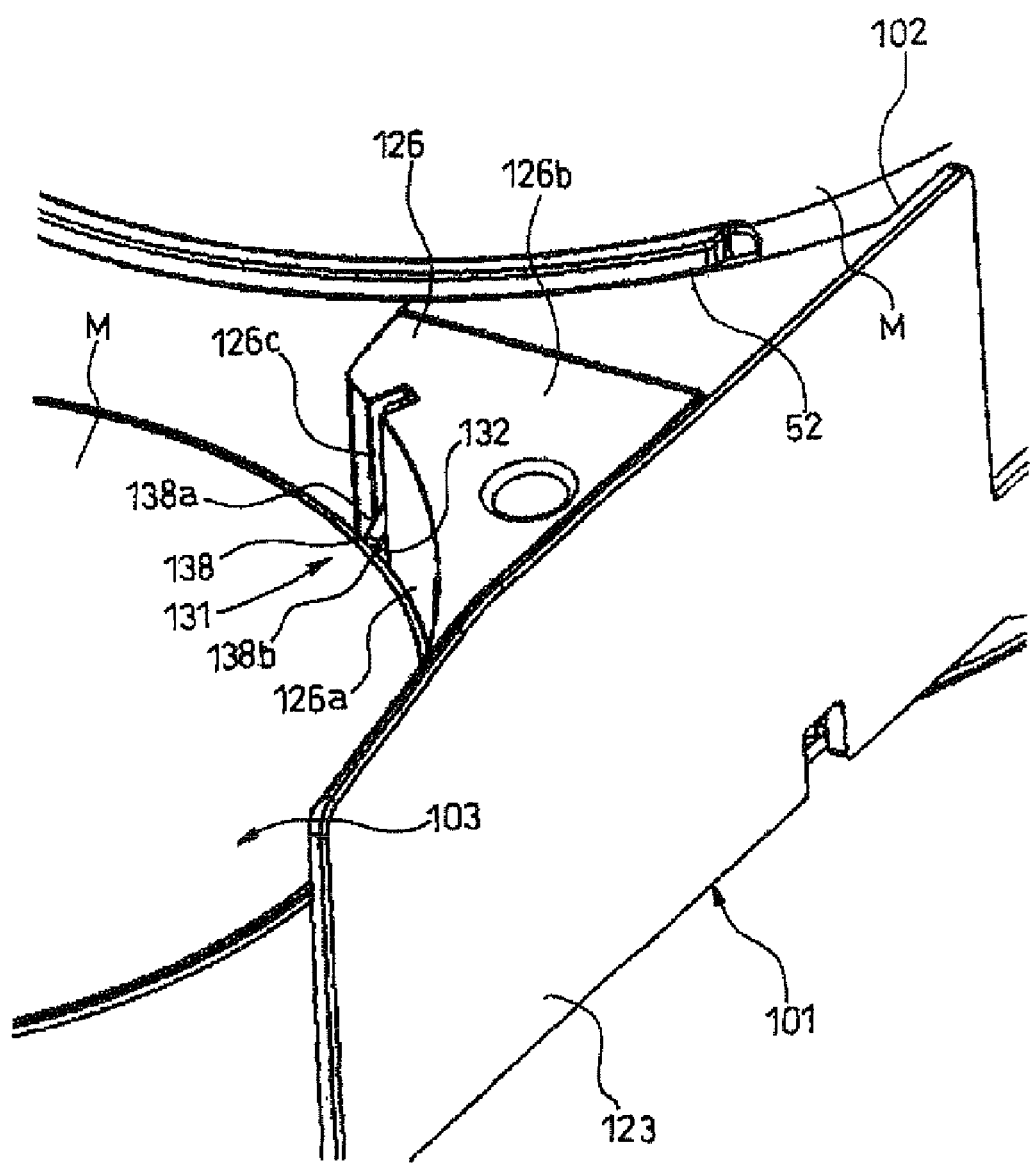
FIG. 16 is a perspective view showing a media detection state in which media are detected by a media-full detection sensor.

When the media M are laminated and accommodated in the media stacker portion 103 for discharging to the maximum accommodation height, as shown in FIG. 16, the uppermost medium M continues to come into contact with the lower inclination face 138b of the protruding portion 138 of the operation arm 132 of the lever 134. Therefore, the lever 134 is prevented from being rotated to the waiting state shown in FIG. 15 and the sensor portion 141 is maintained in the OFF state by the action arm 133.

Since the detection OFF signal sent from the sensor portion 141 of the media-full detection sensor 131 is not less than a predetermined period of time, the control unit judges that the media stacker 103 for discharging is in a full state in which the media M are accommodated to the maximum accommodation height in the media stacker 103 for discharging.

When the media-full detection sensor 131 is provided as described above, when the medium M is sent to the media stacker portion 103 for discharging by the conveyance arm 36, when it is judged according to the detection signal sent from the media-full detection sensor 131 that the media stacker portion 103 for discharging is in the full state in which the maximum number of media are accommodated in the media stacker portion 103 for discharging, the control unit interrupts a conveying action of conveying the media M into the media stacker portion 103 for discharging.

When the user picks up the media M accommodated in the media stacker portion 103 for discharging, the control unit judges according to the detection signal sent from the media-full detection sensor 131 that the media M can be sent to the media stacker portion 103 for discharging. Therefore, the control unit resumes a conveyance motion of conveying the medium M, which is held by the conveyance arm 36, to the media stacker portion 103 for discharging. When the medium M is picked up from the media stacker portion 103 for discharging, since the lever 134 of the media-full detection sensor 131 is rotated, the medium M can be smoothly picked up.

Figure 18:
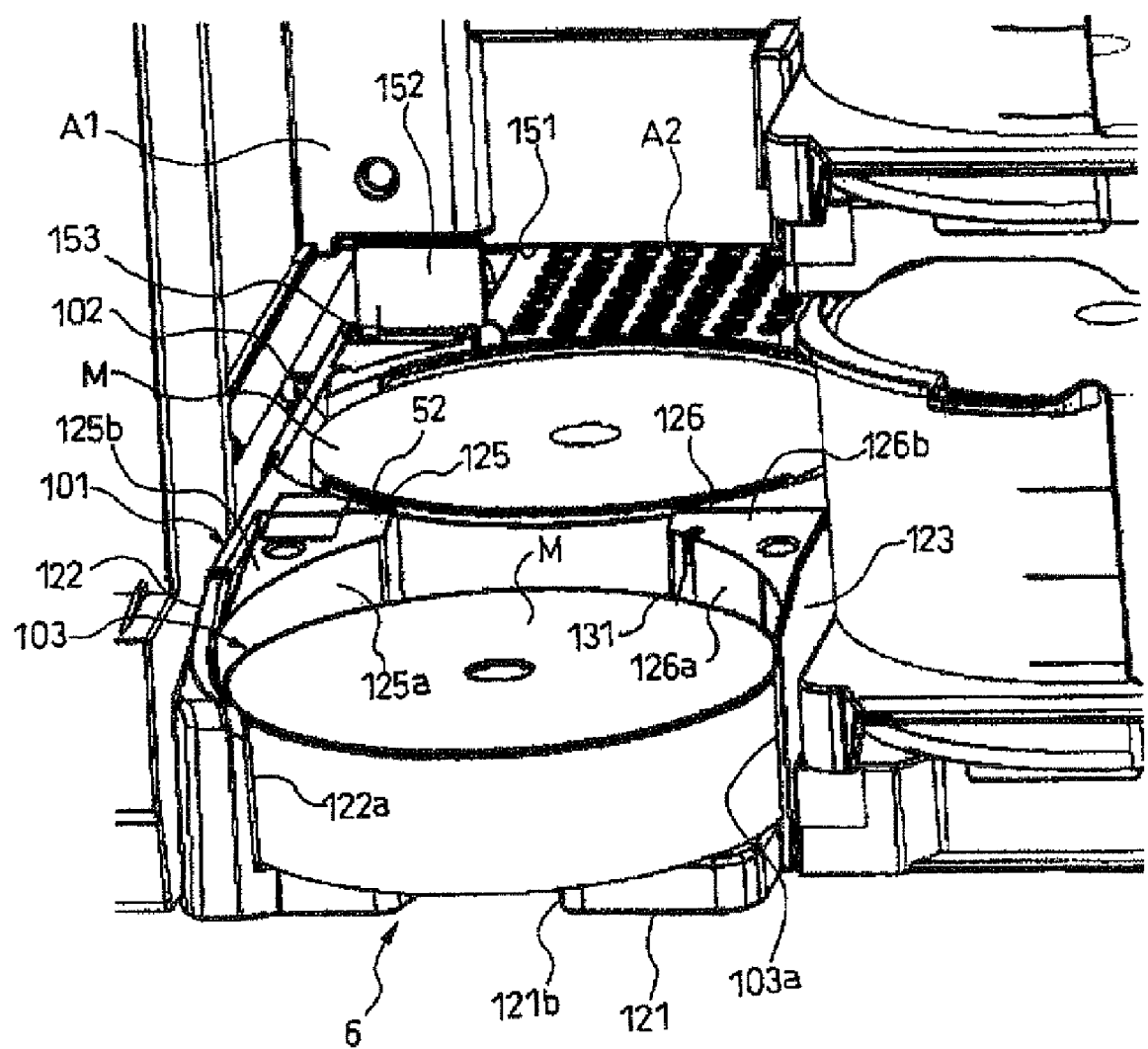
FIG. 18 is a perspective view showing a shutter arranged in a gap through which a media tray comes up.

As shown in FIG. 18, in an upper portion at the rear end of the stacker tray 101, a gap 151 is formed which communicates a media accommodation space A1 on the front side of the processor for accommodating a plurality of media M in each accommodating portion with a processing portion accommodation space A2 in which the label printer 11 is accommodated. The media tray 51 of the label printer 11 can come up from the gap 151.

A shutter 152 is provided in an upper portion on the left at the rear end of the stacker tray 101. The shutter 152 is vertically arranged so that it can close a portion of the gap 151 on the stacker tray 101. A size in the width direction of the gap 151 communicating with the label printer 11 side is reduced to be smaller than the outer diameter of the medium M by the shutter 152.

With this structure, it is possible to prevent the occurrence of a problem where the medium M enters the processing portion accommodating space A2, in which the label printer 11 is accommodated, from the media accommodating space A1 through the gap 151. That is, when the opening and closing door 3 is opened, for example, it is possible to prevent the occurrence of malfunction of the label printer 11 which is caused when the user mistakenly drops the medium M into the processing portion accommodating space A2.

The shutter 152 is preferably formed out of a plate made of resin. The shutter 152 is pivotally supported so that it can be rotated around an axial line in the horizontal direction perpendicular to the moving direction of the media tray 51 in the upper portion of the stacker tray 101 between a substantially horizontal face along the moving direction of the media tray 51 and a substantially vertical face crossing the moving direction of the media tray 51.

The shutter 152 is pushed by a coil spring (pushing means) 153, which is provided on the rotary shaft of the shutter 152, to a rear side in the protruding direction to the media accommodating space A1 of the media tray 51. As such, usually, the shutter 152 is substantially vertically arranged, and a portion of the gap 151 is closed.

Figure 19:
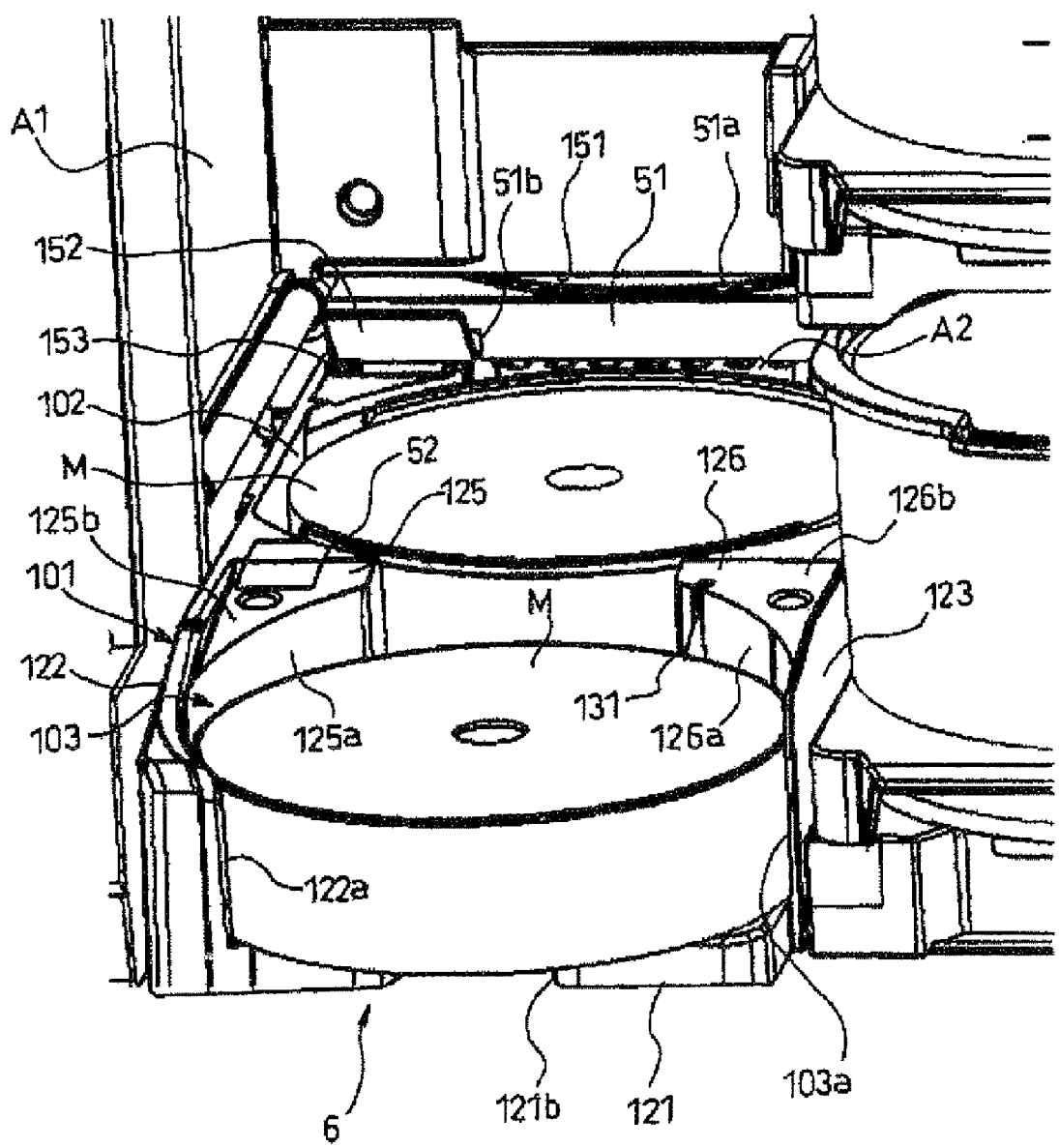
FIGS. 19 and 20 are perspective views for explaining a motion of a shutter.
Figure 20:
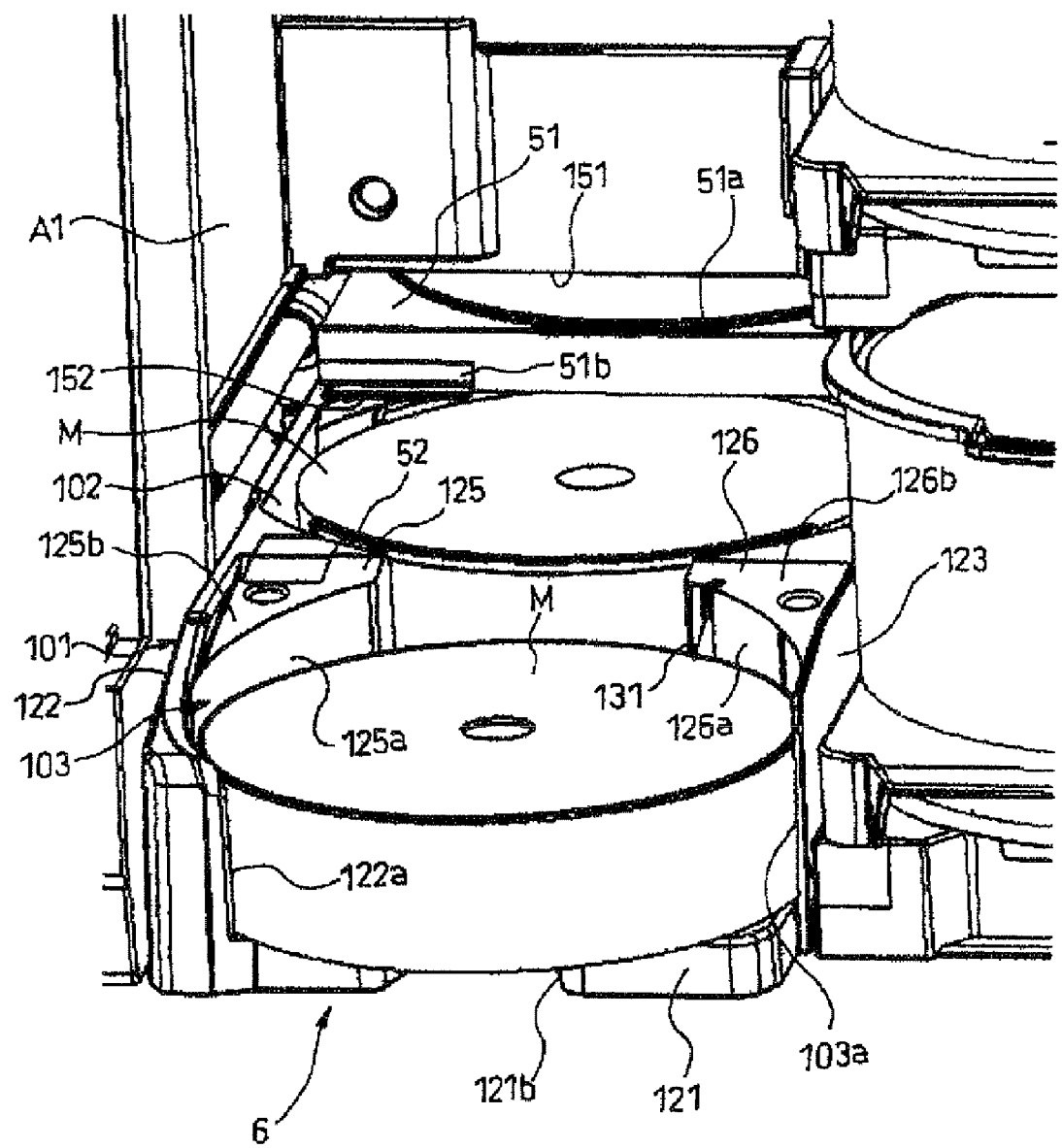

In order to send the medium M into the media stacker portion 103 for discharging, the media tray 51 of the label printer 11 is protruded from the gap 151 onto the media accommodation space A1 side. Then, as shown in FIG. 19, an end face of the protruding media tray 51 comes into contact with the shutter 152. As a consequence, the shutter 152 is rotated onto the front side in the protruding direction of the media tray 51, resisting a pushing force of the coil spring 153. Therefore, as shown in FIG. 20, the media tray 51 is moved above the shutter 152 which has been laid down.

When the protruding media tray 51 is drawn into the gap 151, the shutter 152, which has been rotated and laid down by the media tray 51, is rotated by a pushing force of the coil spring 153 to the rear side in the protruding direction of the media tray 51. Therefore, the shutter 152 is raised substantially vertically. Accordingly, it is possible to prevent the medium M from entering the gap 151.

In this case, the media tray 51 has a pushing portion 51*b*, which is formed out of a protrusion, the cross section of which is circular, in a sliding portion with the shutter 152. The shutter 152 is smoothly slid and rotated while it is coming into line contact with an arcuate outer face of the pushing portion 51*b* of the media tray 51. The media tray 51 can thus be smoothly moved while the resistance caused by friction is suppressed.

It is preferable that a rotating portion of the shutter 152 is separated from a contact portion with the media tray 51 as distantly as possible. As such, the rotary moment of the shutter 152 can be reduced, and the contact resistance with the media tray 51 can be further reduced.

The shutter 152 may be linked with the media tray 51 and rotated without coming into contact with the media tray 51. It is thus possible to reduce a variation of the resistance of the media tray 51 which is caused by contact with the shutter 152 at the time of moving, and thereby prevent a load variation of the media tray 5.

As explained above, according to the stacker tray 101 which is a media stacker of the present embodiment, the media-full detection sensor 131, which detects that a maximum number of the media M are accommodated in the media stacker portion 103 for discharging, is arranged on the arcuate guide face 126*a*. Therefore, according to the detection result sent from the media-full detection sensor 131, it is possible to easily detect that the media M, the number of which is the maximum, are accommodated in the media stacker portion 103 for discharging. It is thus possible to prevent the media M, the number of which exceeds the maximum number of the media M to be accommodated in the media stacker portion 103 for discharging, from being conveyed into the media stacker portion 103. Therefore, it is possible to prevent the media M from overflowing the media stacker portion 103 for discharging.

When the lever 134 is pushed and displaced by the uppermost medium M of the media M which are accommodated in the media stacker portion 103 for discharging by the maximum accommodation number, the sensor portion 141 detects a displacement of the lever 134. Therefore, it is possible to easily and positively detect that the media M of the maximum accommodation number are accommodated in the media stacker portion 103 for discharging.

Further, an upper inclination face 138*a* of the protruding portion 138 is formed into a face which is gently inclined with respect to the moving direction of the medium M. Therefore, when the medium M enters the media stacker portion 103 for discharging, the medium M comes into smooth contact with the upper inclination face 138*a* of the protruding portion 138. The protruding portion 138 of the lever 134 can thus be smoothly pushed into and displaced by a weight of the medium M. Further, there is no possibility of the occurrence of a problem where the medium M is hooked at the protruding portion 138. Accordingly, the medium M can be smoothly sent into the media stacker portion 103 for discharging.

The uppermost medium M of the media M accommodated in the media stacker portion 103 for discharging by the maximum accommodation number of the media M comes into contact with the lower inclination face 138b, the height L of which is substantially the same as the thickness of the media M. Therefore, the protruding portion 138 is positively pushed by the uppermost medium M, and it is possible to detect that the media M of the maximum accommodation number are accommodated in the media stacker portion 103 for discharging. Since the lower side of the protruding portion 138 is formed into an inclination face which is downwardly inclined toward the arcuate guide face 126a, and the protrusion of which is gradually decreased downward, at the time of picking up the medium M from the media stacker portion 103 for discharging, the medium M can be prevented from being hooked at the protruding portion 138. Therefore, the media M can be smoothly taken out.

According to the publisher 1 which is a media processor provided with the media stacker tray 101, at the time of accommodating the media M in the media stacker portion 103 for discharging, when the control unit judges according to the detection signal sent from the media-full detection sensor 131 that the maximum number of the media M are accommodated in the media stacker portion 103 for discharging, a conveyance of the media M into the media stacker portion 103 for discharging is interrupted. Accordingly, an overflow of the media M from the media stacker portion 103 for discharging, which is caused when the media M are further conveyed into the media stacker portion 103 for discharging, can be positively prevented.

When it is judged according to the detection signal sent from the media-full detection sensor 131 that the media M accommodated in the media stacker portion 103 for discharging have been taken out, and it has become possible to accommodate new media M, a conveyance of the media M into the media stacker portion 103 for discharging by the conveyance arm 36, which has been interrupted, is resumed. Therefore, the work can be smoothly conducted after the interruption of the conveyance of the media M.

It should be noted that the media processor described herein is not limited to the above specific embodiment. Variations can be made as would be appreciated by those of ordinary skill in the art. For example, in the above embodiment, the pin 136, which is a rotation fulcrum portion of the L-shaped lever 134, is formed on the lower side. An alternate example in which the rotation fulcrum portion is arranged on the upper side will be explained referring to FIG. 21.

In the drawings, like reference numerals are used to indicate like parts in the drawings, and duplicated explanations are omitted.

Figure 21:
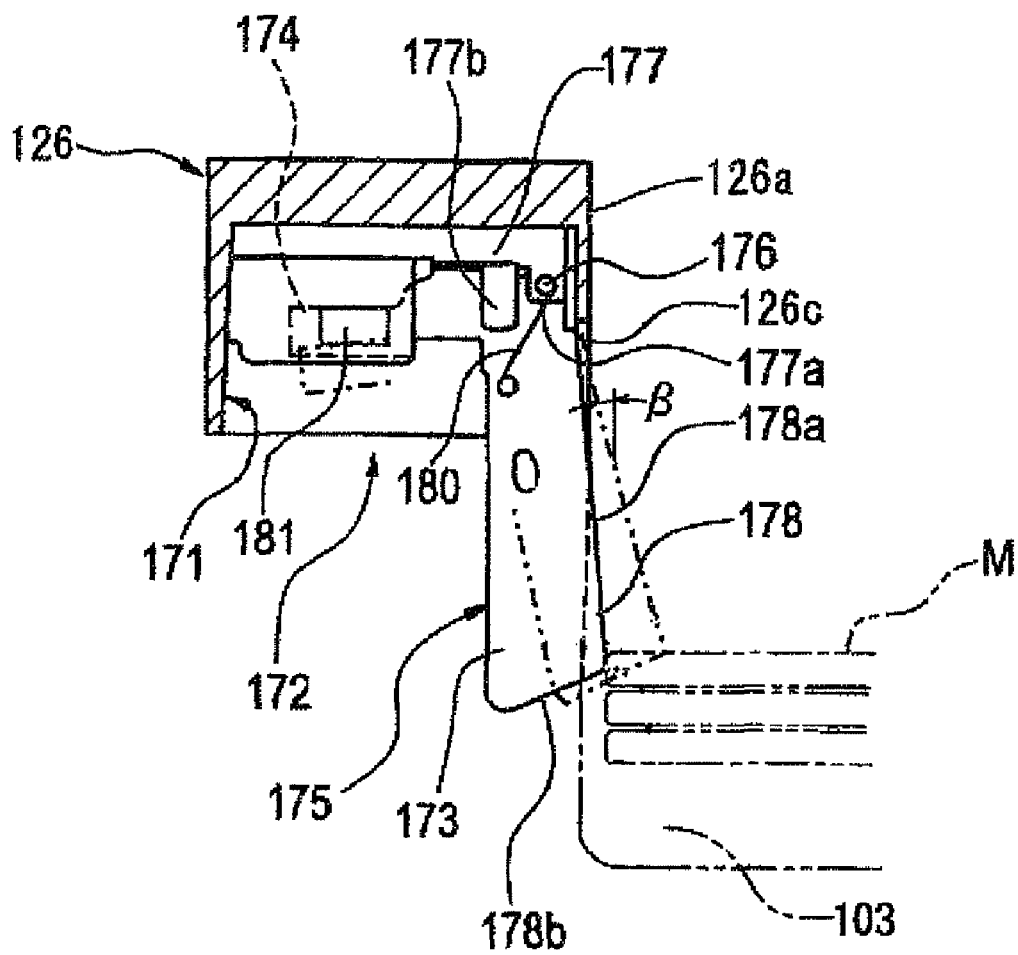
FIG. 21 is a perspective view showing a detection state of detecting a medium by a media-full detection sensor of another embodiment.

FIG. 21 is a perspective view showing a state of detection of the media made by the media-full detection sensor of another embodiment. An attaching recess portion 171, which is recessed upward is formed in a right partitioning portion 126. A media-full detection sensor 172 for detecting a height of the media M, which are accommodated in the media stacker portion 103 for discharging, is arranged in the attaching recess portion 171. The media-full detection sensor 172 protrudes inside from a window portion 126c of an arcuate guide face 126a. Therefore, the media-full detection sensor 172 detects that the height of the media M accommodated in the media stacker portion 103 for discharging has reached the maximum height. In this context, heights of the media M are different according to media type. Therefore, in the media-full detection sensor 172, when the same type media M are accommodated, the maximum number of the media M to be allowed is detected.

The media-full detection sensor 172 is provided with an L-shaped lever 175 having an operation arm 173 and an action arm 174. A pin 176 protruding both sides is formed in the lever 175, at a connecting portion of the operation arm 173 with the action arm 174. The pin 176 is held by a supporting portion 177a of a supporting member 177 attached onto a ceiling face of the partitioning portion 126. With this structure, the lever 175 is supported by the pin 176 and is capable of rotating round the pin 176. A position of the pin 176 of the media-full detection sensor 172 is arranged outside of a position distant from the arcuate guide face 126a. A protruding portion 178 is formed in the operation arm 173 of the lever 175. The forward end portion of the protruding portion 178 is inclined. The protruding portion 178 protrudes from the window portion 126c into the media stacker portion 103 for discharging. The protruding portion 178 is protruded by a pushing force of the spring 180 into the media stacker portion 103 for discharging by a predetermined amount.

An upper side of the protruding portion 178 is formed into an upper sloping face 178a, on the upper side of which the protrusion is gradually reduced. A lower side of the protruding portion 178 is formed into a lower sloping face 178b, on the lower side of which the protrusion is gradually reduced. In other words, the upper side of the protruding portion 178 is formed into the upper sloping face 178a which is upwardly inclined toward the arcuate guide face 126a, and the lower side of the protruding portion 178 is formed into the lower sloping face 178b which is downwardly inclined toward the arcuate guide face 126a. The angle formed between the lower sloping face 178b of the protruding portion 178 and the media M is set as large as possible so that a locking state, in which the lever 175 can not be rotated by a frictional force, can not be generated even when the lower sloping face 178b of the protruding portion 178 is contacted with the media M accommodated in the stacker portion 103 and stopped.

Both sides of the action arm 174 of the lever 175 are slidably guided by the guide piece 177b formed in the support member 177. An optical sensor portion 181 is provided on the side of the action arm 174 in the support member 177. When the protruding portion 178 is most protruding to the stacker portion 103 side, the optical sensor portion 181 is turned on. When the lever 175 is rotated in a direction in which the protruding portion 178 is withdrawn from the stacker portion 103, the sensor portion 181 is turned off by the action arm 174. A detection signal emitted from the sensor portion 181 is transmitted to the control unit, and control is conducted in the same manner as that of the embodiment described before.

In this embodiment, when the dropping medium M collides with the upper sloping face 178a, a moment acts on the lever 175 clockwise as shown in FIG. 21. This direction is the same as the direction in which the protruding portion 178 is withdrawn. Therefore, the protruding portion 178 can be easily withdrawn irrespective of the spring 180 which makes it difficult to rotate the lever 175. Further, even when a sliding load on the lever 175 is increased, the protruding portion 178 can be easily withdrawn. Accordingly, the reliability with respect to the action of the lever 175 is enhanced. Referring to the embodiment described before, in FIG. 15, when the angle α of the upper sloping face 138a of the lever 134 with respect to a vertical plane is increased, it becomes difficult for the lever 134 to be rotated counterclockwise (in the media detecting direction) by the medium M. However, in the second embodiment, even when the angle β of the sloping face 178a with respect to the vertical plane is increased in FIG. 21, the lever 175 is rotated clockwise (in the media detecting direction). As described above, in the case where the plate-shaped media accommodated in the stacker are detected by utilizing the rotation of the lever, when the rotation supporting portion of the lever 134 is arranged at a position distant from the accommodation center in the upper portion of the protruding portion with which the media comes into contact, it is possible to obtain a highly reliable detection mechanism by the moment generated at the time of collision which is not affected by the angle of the sloping face and the friction.

In the embodiments described before, an optical sensor portion is employed. However, a mechanical type sensor, in which a micro-switch is incorporated, may alternatively be employed. In the embodiment described before, the lever is pushed by the twist coil spring. However, the lever may be pushed by a compressive coil spring.

In the embodiment described before, the rotation portion is composed of pins protruding both sides. However, the rotation portion may be a shaft of a different member.

In the stacker, the stacker, a portion of the surrounding guide face is cut out so that the opening portion can be formed. However, all of the surrounding face of which is formed into the guide face may be used. Further, a bottom face may be raised up with respect to the guide face.

The media used for the described embodiments are not limited to the disk-shaped media M. The described system can be applied to polygonal media such as rectangular media, or the system can be applied to elliptical media. The recording system is also not limited to the specific system, for example, an optical recording system, a photo magnetic recording system and so forth may be employed.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A media processor comprising:
   a media stacker adapted to accommodate plate-shaped media in a stacked manner; and
   a sensor operable to detect that a height of the stacked media accommodated in the media stacker reaches a predetermined height, wherein
   the media stacker is provided with the sensor,
   the media stacker includes a bottom face and a side face which define an accommodating space for the media,
   the sensor is provided in the side face,
   the side face is formed with an opening; and
   the sensor includes:
      a lever having a protrusion which is retractably protruded from the opening into the accommodating space;
      a supporting member pivotably supporting the lever; and
      a sensing element operable to detect a movement of the lever,
   wherein an upper part of the protrusion is formed into an upwardly inclined face toward the side face, and wherein the sensor is configured such that the lever remains retracted into the opening when the stacked media reaches the predetermined height.

2. The media processor as set forth in claim 1, wherein the supporting member is disposed outside the accommodating space and above the protrusion.

3. The media processor as set forth in claim 1, further comprising:
   a processing unit operable to perform at least one of data writing into the media and label printing on the media;
   a conveyer operable to convey the media from the processing unit to the media stacker; and
   a controller operable to control the conveyer,
   wherein the controller stops the conveyer conveying the media to the media stacker when the sensor detects that the height of the stacked media accommodated in the media stacker reaches the predetermined height.

4. The media processor as set forth in claim 3, wherein the controller permits the conveyer to convey the media to the media stacker when the sensor does not detect that the height of the stacked media accommodated in the media stacker reaches the predetermined height.

5. The media processor as set forth in claim 1, wherein the lever comprises an L-shaped lever having an operation arm and an action arm defining respective legs of the L shape, and wherein the protrusion is provided on the operation arm and the sensing element is cooperable with the action arm.

6. A media processor comprising:
   a media stacker adapted to accommodate plate-shaped media in a stacked manner; and
   a sensor operable to detect that a height of the stacked media accommodated in the media stacker reaches a predetermined height, wherein
   the media stacker is provided with the sensor,
   the media stacker includes a bottom face and a side face which define an accommodating space for the media,
   the sensor is provided in the side face,
   the side face is formed with an opening; and
   the sensor includes:
      a lever having a protrusion which is retractably protruded from the opening into the accommodating space;
      a supporting member pivotably supporting the lever; and
      a sensing element operable to detect a movement of the lever,
   wherein a lower part of the protrusion is formed into a downwardly inclined face toward the side face, wherein a vertical dimension of the downwardly inclined face is substantially the same as a thickness of a single media, and wherein the sensor is configured such that the lever remains retracted into the opening when the stacked media reaches the predetermined height.

7. A media processor comprising:
   a media stacker adapted to accommodate plate-shaped media in a stacked manner; and
   a sensor operable to detect that a height of the stacked media accommodated in the media stacker reaches a predetermined height, wherein:
   the media stacker includes a bottom face and a side face which define an accommodating space for the media,
   the sensor is provided in the side face,
   the side face is formed with an opening; and
   the sensor includes:
      a lever having a protrusion which is retractably protruded from the opening into the accommodating space; and
      a sensing element operable to detect a movement of the lever,
   an upper part of the protrusion is formed into an upwardly inclined face toward the side face;
   a lower face of the protrusion is formed into a downwardly inclined face toward the side face; and
   an inclined angle of the upwardly inclined face is larger than that of the downwardly inclined face.

* * * * *